US010000058B2

(12) United States Patent
Yamada

(10) Patent No.: US 10,000,058 B2
(45) Date of Patent: *Jun. 19, 2018

(54) LIQUID EJECTING APPARATUS, DRIVE CIRCUIT, AND INTEGRATED CIRCUIT

(71) Applicant: SEIKO EPSON CORPORATION, Tokyo (JP)

(72) Inventor: Tomokazu Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/446,086

(22) Filed: Mar. 1, 2017

(65) Prior Publication Data
US 2017/0266959 A1 Sep. 21, 2017

(30) Foreign Application Priority Data

Mar. 18, 2016 (JP) ................. 2016-055300

(51) Int. Cl.
B41J 2/045 (2006.01)
B41J 2/335 (2006.01)
H02N 2/00 (2006.01)

(52) U.S. Cl.
CPC ....... *B41J 2/04541* (2013.01); *B41J 2/04581* (2013.01); *B41J 2/04588* (2013.01); *B41J 2/04593* (2013.01); *B41J 2/3352* (2013.01); *H02N 2/001* (2013.01); *B41J 2/0455* (2013.01); *B41J 2/04501* (2013.01)

(58) Field of Classification Search
CPC .. B41J 2/04541; B41J 2/3352; B41J 2/04581; B41J 2/0455; B41J 2/04501; B41J 2/04588; B41J 2/04593; H02N 2/001
See application file for complete search history.

(56) References Cited

U.S. PATENT DOCUMENTS 7,852,128 B2   12/2010  Kitazawa et al.
2017/0266958 A1*  9/2017  Yamada ............... B41J 2/04588

FOREIGN PATENT DOCUMENTS

JP   2009-190287 A   8/2009
JP   2010-114711 A   5/2010

* cited by examiner

Primary Examiner — Yaovi M Ameh

(57) ABSTRACT

A liquid ejecting apparatus includes an ejecting unit that includes a piezoelectric element and ejects liquid by driving the piezoelectric element; a first drive circuit that generates a drive signal; and a circuit substrate in which the first drive circuit is disposed. The first drive circuit includes a first integrated circuit having a shape which includes a first side and a second side. The first integrated circuit includes, a first power supply terminal; a second power supply terminal; a first output terminal; and a second output terminal. The first power supply terminal and the second power supply terminal are disposed along the first side. The first output terminal and the second output terminal are disposed along the second side.

6 Claims, 13 Drawing Sheets

<DECODED CONTENT OF DECODER>

| PRINT DATA SI | T1 | | T2 | |
|---|---|---|---|---|
| | Sa | Sb | Sa | Sb |
| LARGE DOT ▶ (1, 1) | H | L | H | L |
| MEDIUM DOT ▶ (0, 1) | H | L | L | H |
| SMALL DOT ▶ (1, 0) | L | L | L | H |
| NO RECORD ▶ (0, 0) | L | H | L | L |

MSB   LSB

LIQUID EJECTING APPARATUS, DRIVE CIRCUIT, AND INTEGRATED CIRCUIT

The entire disclosure of Japanese Patent Application No. 2016-055300, filed Mar. 18, 2016 is expressly incorporated by reference herein.

BACKGROUND

1. Technical Field

The present invention relates to a liquid ejecting apparatus, a drive circuit, and an integrated circuit.

2. Related Art

An apparatus which uses a piezoelectric element (for example, a piezo element) is known as an ink jet printer which prints an image or a document by ejecting ink. Piezoelectric elements are provided in correspondence with each of multiple nozzles in a head unit, each of the piezoelectric elements is driven in accordance with a drive signal, and thereby, a predetermined amount of ink (liquid) is ejected from the nozzle at a predetermined timing to form dots. The piezoelectric element is a capacitive element such as a capacitor from a viewpoint of electricity, and needs to receive a sufficient current in order to operate the piezoelectric elements of each nozzle.

For this reason, a configuration is provided in which an original drive signal which is an origin of a drive signal is amplified by an amplification circuit to be set as a drive signal and the piezoelectric element is driven by the drive signal. It is recommended that an amplification circuit uses a method (linear amplification, refer to JP-A-2009-190287) of current-amplifying the original drive signal in an AB class or the like. However, since power consumption increases and energy efficiency decreases in the linear amplification, a D-class amplification is also proposed in recent years (refer to JP-A-2010-114711). In short, in a D-class amplification, a pulse width modulation or a pulse density modulation of the original drive signal is performed, a high side transistor and a low side transistor that are inserted in series between power supply voltages are switched in accordance with the modulated signal, an output signal which is generated by the switching is filtered by a low pass filter, and thus, the original drive signal is amplified.

However, energy efficiency of a D-class amplification method is higher than that of a linear amplification method, power which is consumed by a low pass filter cannot be ignored, and thus, there is room for improvement in terms of reducing power consumption.

SUMMARY

An advantage of some aspects of the invention is to provide a liquid ejecting apparatus, a drive circuit, and an integrated circuit which are miniaturized for satisfying requirements for a printing apparatus and reduce power consumption.

A liquid ejecting apparatus according to an aspect of the invention includes an ejecting unit that includes a piezoelectric element and ejects liquid by driving the piezoelectric element; a first drive circuit that generates a drive signal from an original drive signal which is an origin of the drive signal driving the piezoelectric element in accordance with a first voltage and a second voltage higher than the first voltage; and a circuit substrate in which the first drive circuit is disposed. The first drive circuit includes, a first pair of transistors to which the first voltage is applied; a second pair of transistors which is electrically coupled in series to the first pair of transistors and to which the second voltage is applied; and a first integrated circuit having a shape which includes a first side and a second side different from the first side. The first integrated circuit includes, a first power supply terminal to which the first voltage is applied; a second power supply terminal to which the second voltage is applied; a first output terminal which outputs a first control signal for controlling the first pair of transistors in accordance with the original drive signal; and a second output terminal which outputs a second control signal for controlling the second pair of transistors in accordance with the original drive signal. The first pair of transistors is electrically coupled to the first power supply terminal through a first power supply wire which is provided on the circuit substrate. The second pair of transistors is electrically coupled to the second power supply terminal through a second power supply wire which is provided on the circuit substrate. The first power supply terminal and the second power supply terminal are disposed along the first side. The first output terminal and the second output terminal are disposed along the second side.

According to the liquid ejecting apparatus of the aspect, power consumption is reduced, and in addition, the first pair of transistors and the second pair of transistors can be efficiently disposed near the first integrated circuit. For this reasons, it is possible to reduce an area of the circuit substrate, to secure wide wire widths of a first power supply wire and a second power supply wire, and to reduce resistance.

In the liquid ejecting apparatus according to the aspect, the first side and the second side may face each other.

In addition, in the liquid ejecting apparatus according to the aspect, the first power supply wire and the second power supply wire is preferably disposed in a position where the circuit substrate overlaps the first integrated circuit in a planar view.

In the liquid ejecting apparatus according to the aspect, a second drive circuit including a second integrated circuit may be disposed in the circuit substrate, and the first side of the first integrated circuit and the second side of the second integrated circuit may be respectively disposed in positions where face each other.

The liquid ejecting apparatus may eject liquid, and includes a three-dimensional shaping apparatus (so-called 3D printer), a textile printing apparatus, or the like, in addition to a printing apparatus which will be described below.

In addition, the invention is not limited to a liquid ejecting apparatus, can be realized in various aspects, and can also be conceptualized by a drive circuit driving a capacitive load, such as a piezoelectric element, an integrated circuit which configures the drive circuit, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings by using a printing apparatus as an example.

Figure 1:
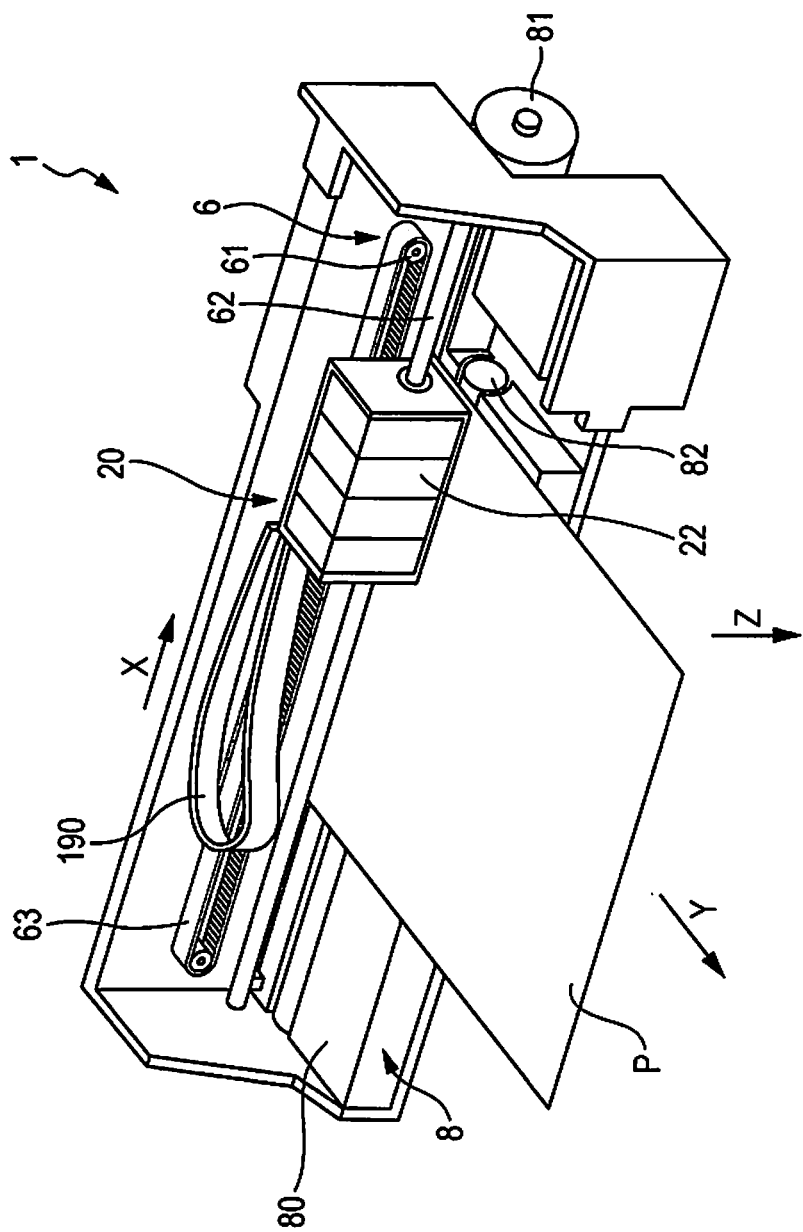
FIG. 1 is a view illustrating a schematic configuration of a printing apparatus to which a drive circuit according to an embodiment is applied.

FIG. 1 is a perspective view illustrating a schematic configuration of a printing apparatus to which a drive circuit according to an embodiment is applied.

The printing apparatus illustrated in this figure is a type of a liquid ejecting apparatus which ejects ink that is an example of liquid to form an ink dot group on a medium P such as paper, thereby, printing an image (including characters, graphics, or the like).

As illustrated in FIG. 1, the printing apparatus 1 includes a moving mechanism 6 which moves (moves back and forth) a carriage 20 in a main scanning direction (X direction).

The moving mechanism 6 includes a carriage motor 61 which moves the carriage 20, a carriage guide axis 62 both of which are fixed, and a timing belt 63 which extends substantially parallel to the carriage guide axis 62 and is driven by the carriage motor 61.

The carriage 20 is supported by the carriage guide axis 62 so as to move freely back and forth, and is fixed to a part of the timing belt 63. For this reason, if the timing belt 63 travels forward and backward by the carriage motor 61, the carriage 20 is guided by the carriage guide axis 62 and moves back and forth.

A printing head 22 is mounted in the carriage 20. The printing head 22 includes multiple nozzles which respectively eject ink in the Z direction onto a portion which faces the medium P. The printing head 22 is divided into approximately four blocks for color printing. The multiple blocks respectively eject black (Bk) ink, cyan (C) ink, magenta (M) ink, and yellow (Y).

There is provided a configuration in which various control signals or the like, which include a drive signal from a main substrate (omitted in FIG. 1) through a flexible flat cable 190, are supplied to the carriage 20.

The printing apparatus 1 includes a transport mechanism 8 which transports the medium P on a platen 80. The transport mechanism 8 includes a transport motor 81 which is a drive source, and a transport roller 82 which is rotated by the transport motor 81 and transports the medium P in a sub-scanning direction (Y direction).

In the configuration, an image is formed on a surface of the medium P by ejecting ink in accordance with print data from the nozzles of the printing head 22 in accordance with main scanning of the carriage 20, and repeating an operation of transporting the medium P in accordance with the transport mechanism 8.

In the present embodiment, the main scanning is performed by moving the carriage 20, but may be performed by moving the medium P, and may be performed by moving both the carriage 20 and the medium P. The point is that there may be provided a configuration in which the medium P and the carriage 20 (printing head 22) move relatively.

Figure 2A:
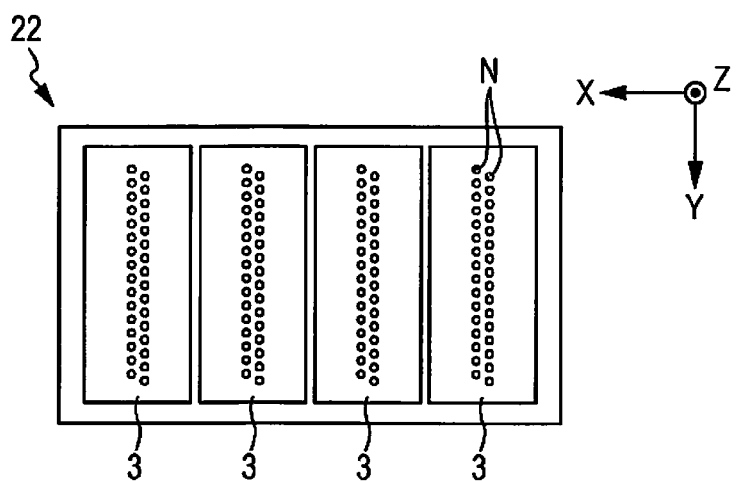
FIG. 2A is a diagram illustrating arrangement or the like of nozzles in a head unit.

FIG. 2A is a diagram illustrating a configuration in a case in which an ejecting surface of ink in the printing head 22 is viewed from the medium P. As illustrated in FIG. 2A, the printing head 22 includes four head units 3. The four head units 3 are arranged in the X direction which is a main scanning direction in correspondence with black (Bk), cyan (C), magenta (M), and yellow (Y), respectively.

Figure 2B:
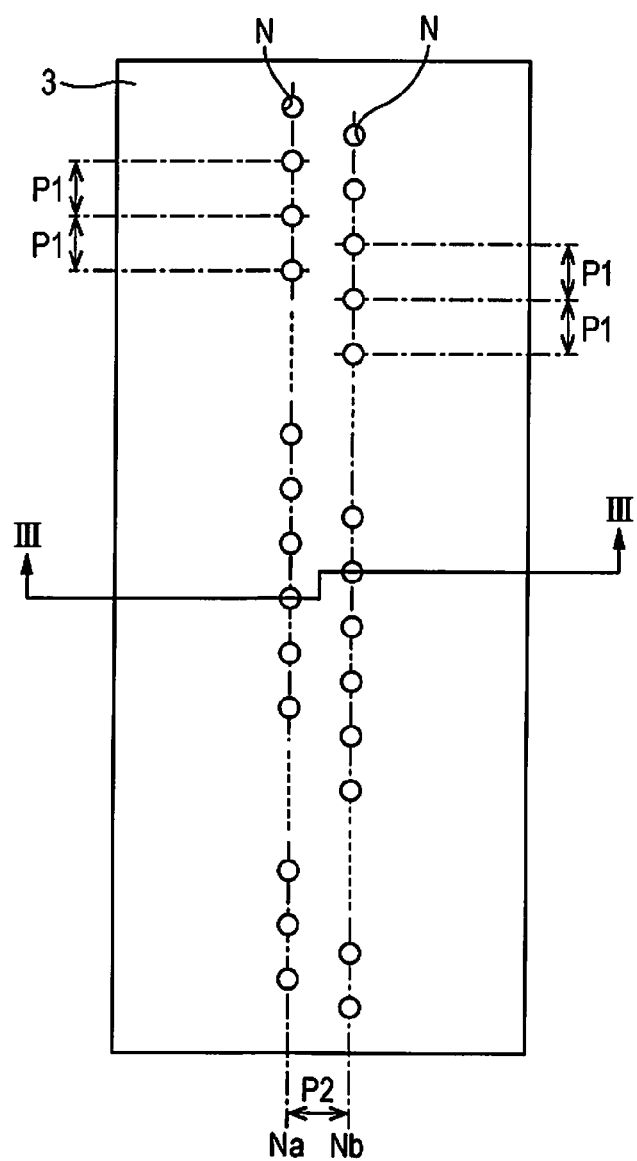
FIG. 2B is a diagram illustrating arrangement or the like of the nozzles in the head unit.

FIG. 2B is a diagram illustrating arrangement of nozzles in one head unit 3.

As illustrated in FIG. 2B, multiple nozzles N are arranged in two columns in one head unit 3. For the sake of convenience, the two columns are respectively referred to as a nozzle column Na and a nozzle column Nb.

Multiple nozzles N are respectively arranged in the Y direction which is a subscan direction by a pitch P1 in the nozzle columns Na and Nb. In addition, the nozzle columns Na and Nb are separated from each other by a pitch P2 in the X direction. The nozzles N in the nozzle column Na are shifted from the nozzles N in the nozzle column Nb by half of the pitch P1 in the Y direction.

In this way, the nozzles N are arranged so as to be shifted by half of the pitch P1 in the two columns of the nozzle columns Na and Nb in the Y direction, and thereby it is possible to increase resolution in the Y direction substantially twice as much as a case of one column.

The number of nozzles N in one head unit 3 is referred to as m (m is an integer greater than or equal to 2) for the sake of convenience.

While not illustrated in particular, the head unit 3 has a configuration in which a flexible circuit substrate is coupled to an actuator substrate, and an IC is mounted on the flexible circuit substrate. Hence, next, a structure of the actuator substrate will be described.

Figure 3:
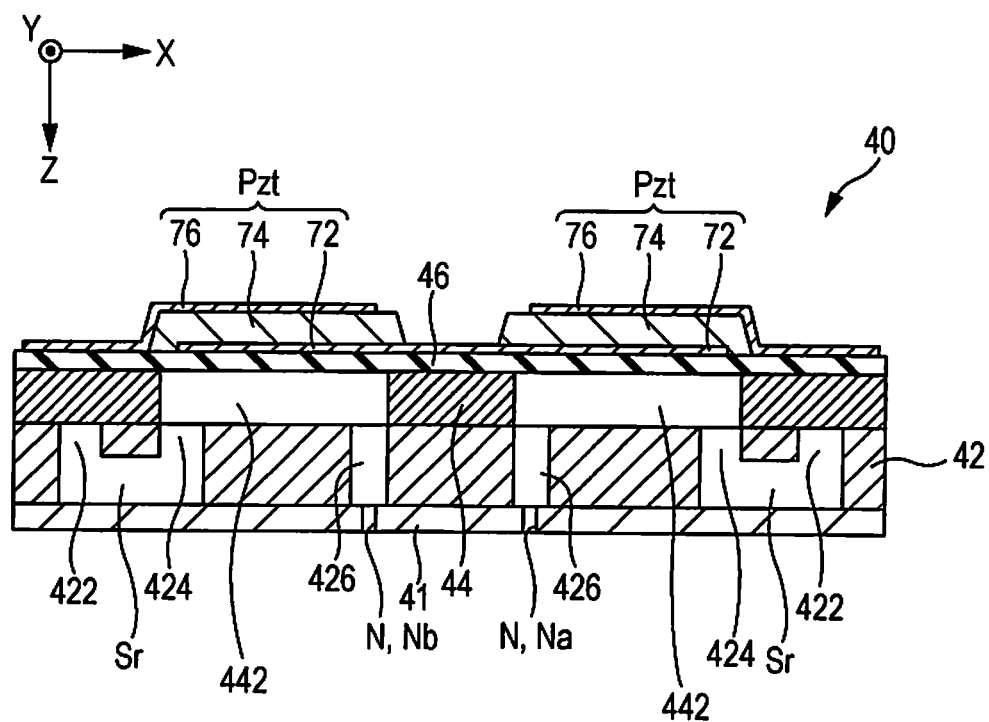
FIG. 3 is a sectional view illustrating an essential configuration of the head unit.

FIG. 3 is a sectional view illustrating a structure of the actuator substrate. In detail, FIG. 3 is a view illustrating a cross section taken along line of FIG. 2B.

As illustrated in FIG. 3, the actuator substrate 40 has a structure in which a pressure chamber substrate 44 and a vibration plate 46 are provided on a surface on a negative side in the Z direction and a nozzle plate 41 is provided on a surface on a positive side in the Z direction, in a flow path substrate 42.

Schematically, each element of the actuator substrate 40 is a member of an approximately flat plate which is long in the Y direction, and is fixed to each other by for example, an adhesive or the like. In addition, the flow path substrate 42 and the pressure chamber substrate 44 are formed by, for example, a single crystal substrate of silicon.

The nozzles N are formed in the nozzle plate 41. A structure corresponding to the nozzles in the nozzle column Na is shifted from a structure corresponding to the nozzles in the nozzle column Nb by half of the pitch P1 in the Y direction, but the nozzles are formed approximately symmetrically except for that, and thus, the structure of the actuator substrate 40 will be hereinafter described by focusing on the nozzle column Na.

The flow path substrate 42 is a flat member which forms a flow path of ink, and includes an opening 422, a supply flow path 424, and a communication flow path 426. The supply flow path 424 and the communication flow path 426 are formed in each nozzle, and the opening 422 is continuously formed over the multiple nozzles and has a structure in which ink with a corresponding color is supplied. The opening 422 functions as a liquid reservoir chamber Sr, and a bottom surface of the liquid reservoir chamber Sr is configured by, for example, the nozzle plate 41. In detail, the nozzle plate 41 is fixed to the bottom surface of the flow path substrate 42 so as to close the opening 422, the supply flow path 424, and the communication flow path 426 which are in the flow path substrate 42.

The vibration plate 46 is installed on a surface on a side opposite to the flow path substrate 42, in the pressure chamber substrate 44. The vibration plate 46 is a member of an elastically vibratile flat plate, and is configured by stacking an elastic film formed of an elastic material such as a silicon oxide, and an insulating film formed of an insulating material such as a zirconium oxide. The vibration plate 46 and the flow path substrate 42 face each other with an interval in the inner side of each opening 422 of the pressure chamber substrate 44. A space between the flow path substrate 42 and the vibration plate 46 in the inner side of each opening 422 functions as a cavity 442 which provides pressure to ink. Each cavity 442 communicates with the nozzle N through the communication flow path 426 of the flow path substrate 42.

A piezoelectric element Pzt is formed in each nozzle N (cavity 442) on a surface on a side opposite to the pressure chamber substrate 44 in the vibration plate 46.

The piezoelectric element Pzt includes a common drive electrode 72 formed over the multiple piezoelectric elements Pzt formed on a surface of the vibration plate 46, a piezoelectric body 74 formed on a surface of the drive electrode 72, and individual drive electrodes 76 formed in each piezoelectric element Pzt on a surface of the piezoelectric body 74. In the configuration, a region in which the piezoelectric body 74 is interposed between the drive electrode 72 and the drive electrode 76 which face each other, functions as the piezoelectric element Pzt.

The piezoelectric body 74 is formed in a process which includes, for example, a heating process (baking). In detail, the piezoelectric body 74 is formed by baking a piezoelectric material which is applied to a surface of the vibration plate 46 on which multiple drive electrodes 72 are formed, using heating processing of a furnace, and then molding (milling by using, for example, plasma) the baked material for each piezoelectric element Pzt.

In the same manner, the piezoelectric element Pzt corresponding to the nozzle column Nb is also configured to include the drive electrode 72, the piezoelectric body 74, and the drive electrode 76.

In addition, in this example, in the piezoelectric body 74, the common drive electrode 72 is used as a lower layer and the individual drive electrodes 76 are used as an upper layer, but in contrast to this, a configuration in which the common drive electrode 72 is used as an upper layer and the individual drive electrodes 76 are used as a lower layer, may be provided.

A configuration may be provided in which the IC is directly mounted in the actuator substrate 40.

As will be described below, meanwhile a voltage Vout of a drive signal according to the amount of ink to be ejected is individually applied to the drive electrode 76 which is a terminal of the piezoelectric element Pzt, a retention signal of a voltage $V_{BS}$ is commonly applied to the drive electrode 72 which is the other terminal of the piezoelectric element Pzt.

For this reason, the piezoelectric element Pzt becomes displaced upwardly or downwardly in accordance with a voltage which is applied to the drive electrodes 72 and 76. In detail, if the voltage Vout of the drive signal which is applied through the drive electrode 76 decreases, the central portion of the piezoelectric element Pzt is bent upwardly with respect to both end portions, and meanwhile, if the voltage Vout increases, the central portion of the piezoelectric element Pzt is bent downwardly.

If the central portion is bent upwardly, an internal volume of the cavity 442 increases (pressure decreases), and thus ink is drawn from the liquid reservoir chamber Sr. Meanwhile, if the central portion is bent downwardly, an internal volume of the cavity 442 decreases (pressure increases), and thus, an ink droplet is ejected from the nozzle N in accordance with the decreased degree. In this way, if a proper drive signal is applied to the piezoelectric element Pzt, ink is ejected from the nozzle N in accordance with the displacement of the piezoelectric element Pzt. For this reason, an ejecting unit which ejects ink in accordance with at least the piezoelectric element Pzt, the cavity 442, or the nozzle N, is configured.

Next, an electrical configuration of the printing apparatus 1 will be described.

Figure 4:
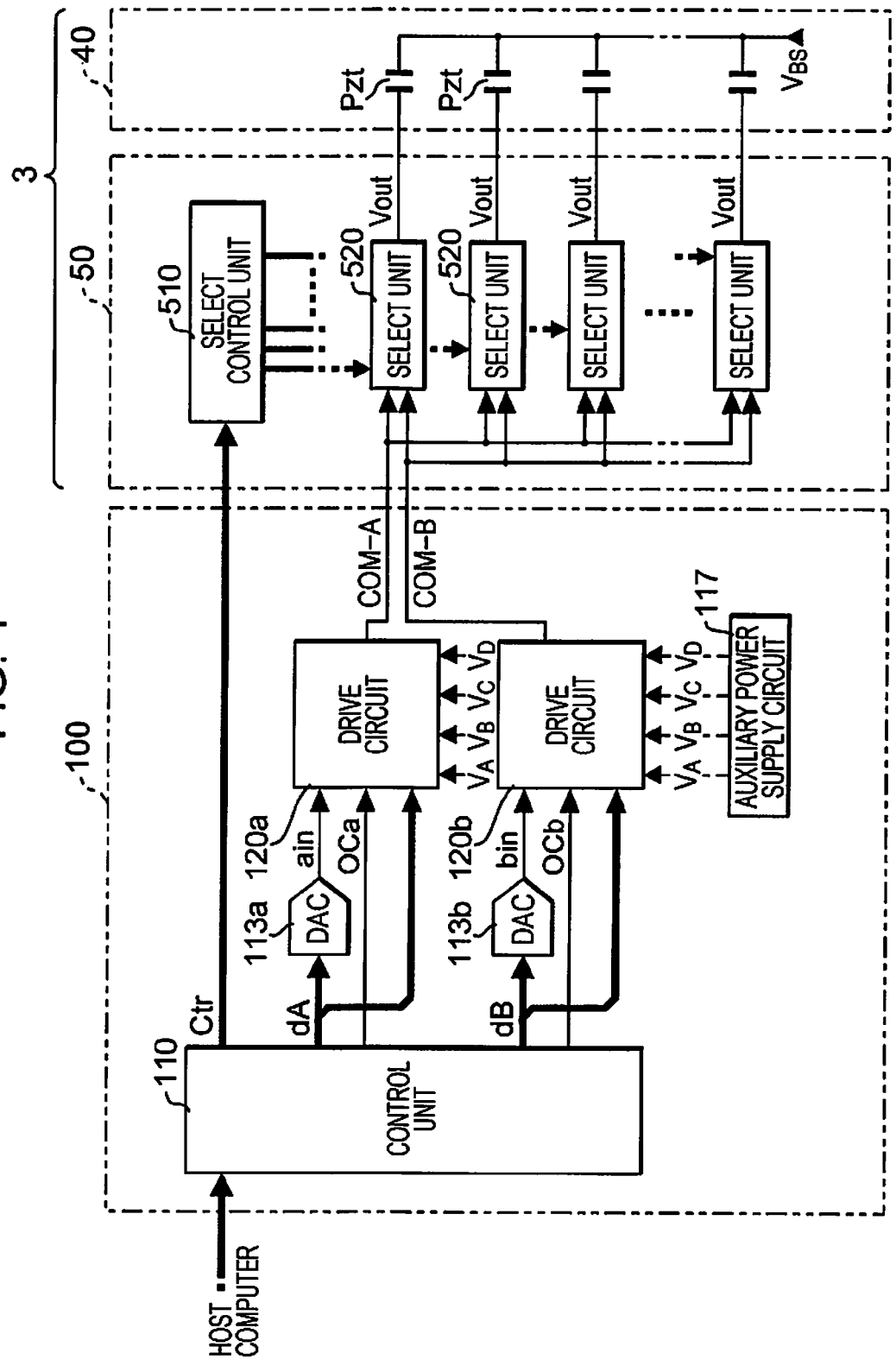
FIG. 4 is a block diagram illustrating an electrical configuration of the printing apparatus.

FIG. 4 is a block diagram illustrating an electrical configuration of the printing apparatus 1.

As illustrated in FIG. 4, the printing apparatus 1 has a configuration in which the head unit 3 is coupled to a main substrate 100 through flexible flat cable (not illustrated in FIG. 4). The head unit 3 is largely divided into the actuator substrate 40 and an integrated circuit (IC) 50, and among these, the IC 50 receives a control signal Ctr or drive signals COM-A and COM-B from the main substrate 100.

The printing apparatus 1 includes four head units 3 and the main substrate 100 independently controls the four head units 3. The four head units 3 are the same as each other except that the colors of ink to be ejected are different from each other, and thus, hereinafter, one head unit 3 will be representatively described for the sake of convenience.

As illustrated in FIG. 4, the main substrate 100 includes a control unit 110, D/A converters (Digital Analog Converter, DAC) 113a and 113b, drive circuits 120a and 120b, and an auxiliary power supply circuit 117.

Among these, the control unit 110 is a type of a microcontroller having a CPU, a RAM, a ROM, and the like, and outputs various control signals or the like for controlling each unit by executing a predetermined program, when image data which becomes a printing target is supplied from a host computer or the like.

In detail, first, the control unit 110 repeatedly supplies digital data dA to the DAC 113a, and repeatedly supplies digital data dB to the DAC 113b in the same manner. Here, the data dA defines a waveform of the drive signal COM-A which is supplied to the head unit 3, and the data dB defines a waveform of the drive signal COM-B.

Second, the control unit 110 outputs the signal OCa in accordance with the data dA which is supplied, and outputs the signal OCb in accordance with the data dB which is supplied.

The DAC 113a converts the digital data dA into analog signal ain. The drive circuit 120a, which will be described below, voltage-amplifies a signal ain by, for example, 10 times using voltages $V_A$, $V_B$, $V_C$, and $V_D$ so as to be able to drive a plurality of the piezoelectric elements Pzt which are capacitive loads, converts the signal into low impedance, and outputs the signal as the drive signal COM-A.

In the same manner, the DAC 113b converts the digital data dB into analog signal bin. The drive circuit 120b voltage-amplifies the signal bin by 10 times using the voltages $V_A$, $V_B$, $V_C$, and $V_D$, converts the signal into low impedance, and outputs the signal as the drive signal COM-B.

The auxiliary power supply circuit 117 generates the voltages $V_A$, $V_B$, $V_C$, and $V_D$ which are used for drive circuits 120a and 120b.

The signal ain which is obtained by performing analog conversion and the drive signal COM-A have trapezoidal waveforms as will be described below, and the signal OCa is output in accordance with the trapezoidal waveform. In the same manner, the signal bin which is obtained by performing analog conversion and the drive signal COM-B also have trapezoidal waveforms, and the signal OCb is output in accordance with the trapezoidal waveform. Waveforms of the drive signals COM-A (ain) and COM-B (bin) and the signals OCa and OCb will be described below.

In addition, the signal ain (bin) which is converted by the DAC 113a (113b) performs a relatively small swing in a range of a voltage of, for example, approximately 0 V to 4 V, and in contrast to this, the drive signal COM-A (COM-B) performs a relatively large swing in a range of a voltage of, for example, approximately 0 V to 40 V.

Third, the control unit 110 supplies various control signals Ctr to the head unit 3, in synchronization with control for the moving mechanism 6 and the transport mechanism 8. The control signal Ctr which is supplied to the head unit 3 includes print data (ejection control signal) which defines the amount of ink which is ejected from the nozzle N, a clock signal which is used for transmission of the print data, a timing signal which defines a print period or the like, and the like.

The control unit 110 controls the moving mechanism 6 and the transport mechanism 8, but such a configuration is known, and thus, description thereof will be omitted.

Meanwhile, in the head unit 3, the IC 50 is an integrated circuit which includes functions of a select control unit 510 and select units 520 corresponding to the piezoelectric elements Pzt one to one. Among these, the select control unit 510 controls selection of each of the select units 520. In detail, the select control unit 510 stores the print data which is supplied in synchronization with a clock signal from the control unit 110 by the amount of several nozzles (piezoelectric elements Pzt) of the head unit 3 once, and instructs each select unit 520 to select the drive signals COM-A and COM-B in accordance with the print data at a start timing of a print period which is defined by a timing signal.

Each select unit 520 selects (or does not select any one) one of the drive signals COM-A and COM-B in accordance with instruction of the select control unit 510, and applies the selected signal to one terminal of the corresponding piezoelectric element Pzt as a drive signal of the voltage Vout.

As described above, one piezoelectric element Pzt is provided in each nozzle N in the actuator substrate 40. The other terminals of each piezoelectric element Pzt are coupled in common, and the voltage $V_{BS}$ is applied by a circuit which is not illustrated. The voltage $V_{BS}$ maintains the other terminals of the plurality of the piezoelectric elements Pzt in a constant state.

In the present embodiment, ink is ejected from one nozzle N maximum twice by one dot, and thus four gradations of a large dot, a medium dot, a small dot, and no record are represented. In the present embodiment, in order to represent the four gradations, two types of the drive signals COM-A and COM-B are prepared, and each period has first half pattern and a second half pattern. Then, during one period, the drive signals COM-A and COM-B are selected (or not selected) in accordance with a gradation to be represented in the first half and a second half, and the selected signal is supplied to the piezoelectric element Pzt.

Thus, the drive signals COM-A and COM-B will be first described, and thereafter, a detailed configuration of the select control unit 510 for selecting the drive signals COM-A and COM-B, and the select unit 520 will be described.

Figure 5:
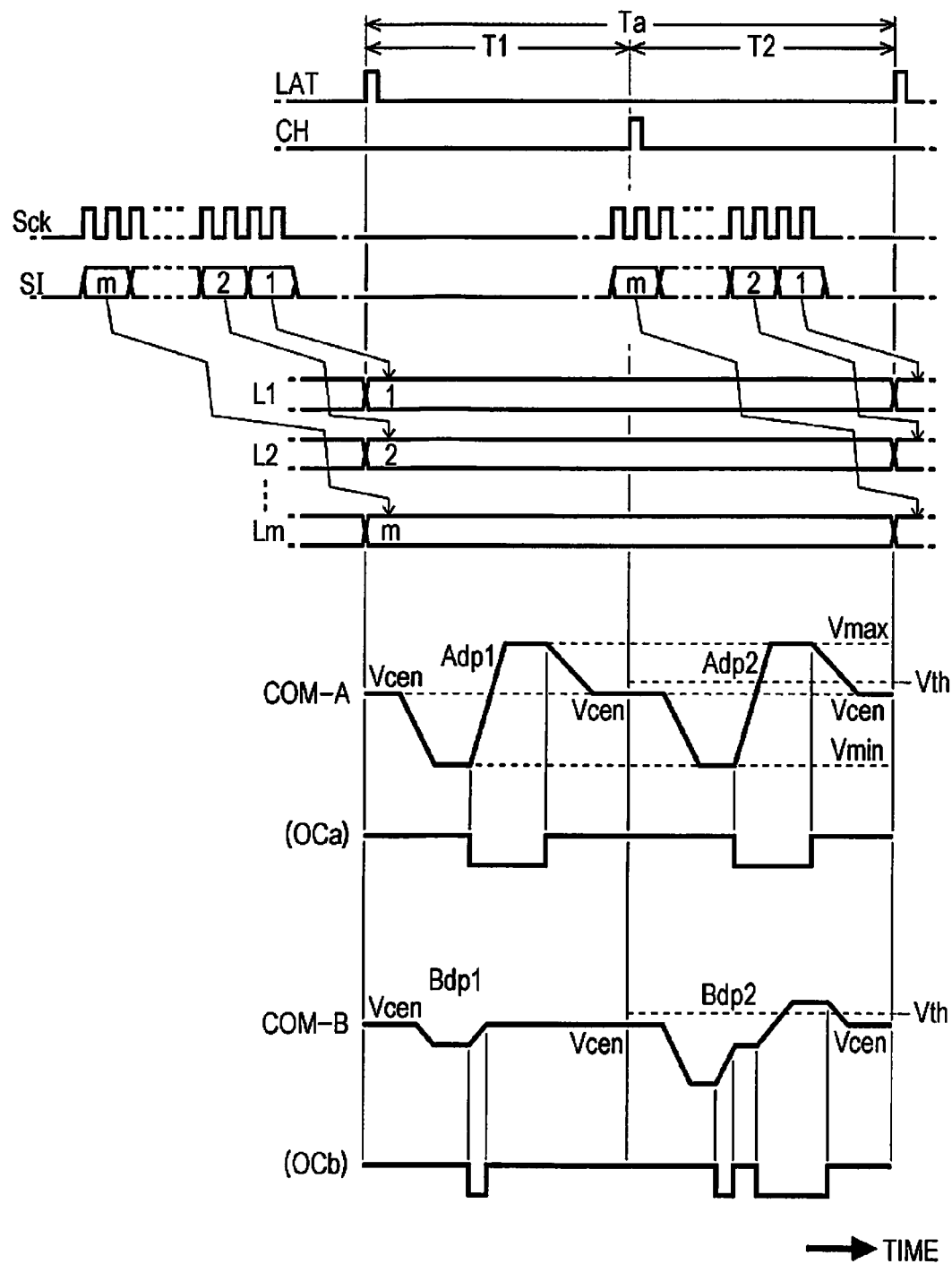
FIG. 5 is a diagram illustrating waveforms or the like of drive signals.

FIG. 5 is a diagram illustrating waveforms or the like of drive signals COM-A and COM-B.

As illustrated in FIG. 5, the drive signal COM-A is configured by a repeated waveform of a trapezoidal waveform Adp1 which is disposed during a period T1 from time when a control signal LAT is output (rises) to time when a control signal CH is output, during a print period Ta, and a trapezoidal waveform Adp2 which is disposed during a period T2 from time when the control signal CH is output and to the control signal LAT is output during the print period Ta.

In the present embodiment, the trapezoidal waveforms Adp1 and Adp2 are approximately the same waveforms as each other, and are waveforms which eject ink of a predetermined amount, specifically, an approximately medium amount from the nozzle N corresponding to the piezoelectric elements Pzt, if each waveform is supplied to the drive electrode 76 which is one terminal of the piezoelectric elements Pzt.

The drive signal COM-B is configured by a repeated waveform of a trapezoidal waveform Bdp1 which is disposed during the period T1 and a trapezoidal waveform Bdp2 which is disposed during the period T2. In the present embodiment, the trapezoidal waveforms Bdp1 and Bdp2 are waveforms different form each other. Among these, the trapezoidal waveform Bdp1 is a waveform for preventing an increase of viscosity of ink by slightly vibrating the ink near the nozzle N. For this reason, even if the trapezoidal waveform Bdp1 is supplied to the one terminal of the piezoelectric element Pzt, ink is not ejected from the nozzle N corresponding to the piezoelectric element Pzt. In addition, the trapezoidal waveform Bdp2 is a waveform different from the trapezoidal waveform Adp1 (Adp2). If the trapezoidal waveform Bdp2 is supplied to the one terminal of the piezoelectric element Pzt, the trapezoidal waveform Bdp2 becomes a waveform which ejects the amount of ink less than the predetermined amount from the nozzle N corresponding to the piezoelectric element Pzt.

Voltages at a start timing of the trapezoidal waveforms Adp1, Adp2, Bdp1, and Bdp2, and voltages at an end timing of the trapezoidal waveforms Adp1, Adp2, Bdp1, and Bdp2 are all common at a voltage Vcen. That is, the trapezoidal waveforms Adp1, Adp2, Bdp1, and Bdp2 are waveforms which respectively start at the voltage Vcen and ends at the voltage Vcen.

As described above, since the drive circuit 120a (120b) voltage-amplifies the signal ain (bin) by 10 times, impedance-converts the amplified signal, and outputs the signal as the drive signal COM-A (COM-B). For this reasons, there is a slight difference between a waveform of the signal ain (bin) and a waveform of the drive signal COM-A (COM-B) and thus, the two waveforms may be considered to be different from each other.

The control unit 110 outputs the signal OCa having the following logic level with respect to the trapezoidal waveform of the drive signal COM-A to the drive circuit 120a.

In detail, the control unit 110 makes the signal OCa go to an H level during a period in which a voltage of the drive signal COM-A (signal ain) decreases and a period in which the drive signal COM-A is constant at a voltage lower than a threshold value Vth, and other than that, makes the signal OCa go to an L level during a period in which the voltage of the drive signal COM-A increases and a period in which the drive signal COM-A is constant at a voltage higher than or equal to the threshold value Vth.

In the present example, when a maximum value of the voltage of the drive signal COM-A is referred to as max and a minimum value thereof is referred to as min, description will be made as a relationship of max>Vth>Vcen>min for the sake of convenient. The relationship may be max>Vcen>Vth>min.

In the same manner, the control unit 110 outputs a signal OCb having the following logic level with respect to the trapezoidal waveform of the drive signal COM-B to the drive circuit 120b. In detail, the control unit 110 makes the signal OCb go to an H level during a period in which a voltage of the drive signal COM-B (signal Bin) decreases and a period in which the drive signal COM-B is constant at a voltage lower than the threshold value Vth, and other than that, go to an L level during a period in which the voltage of the drive signal COM-B increases and a period in which the drive signal COM-B is constant at a voltage higher than or equal to the threshold value Vth.

Figure 6:
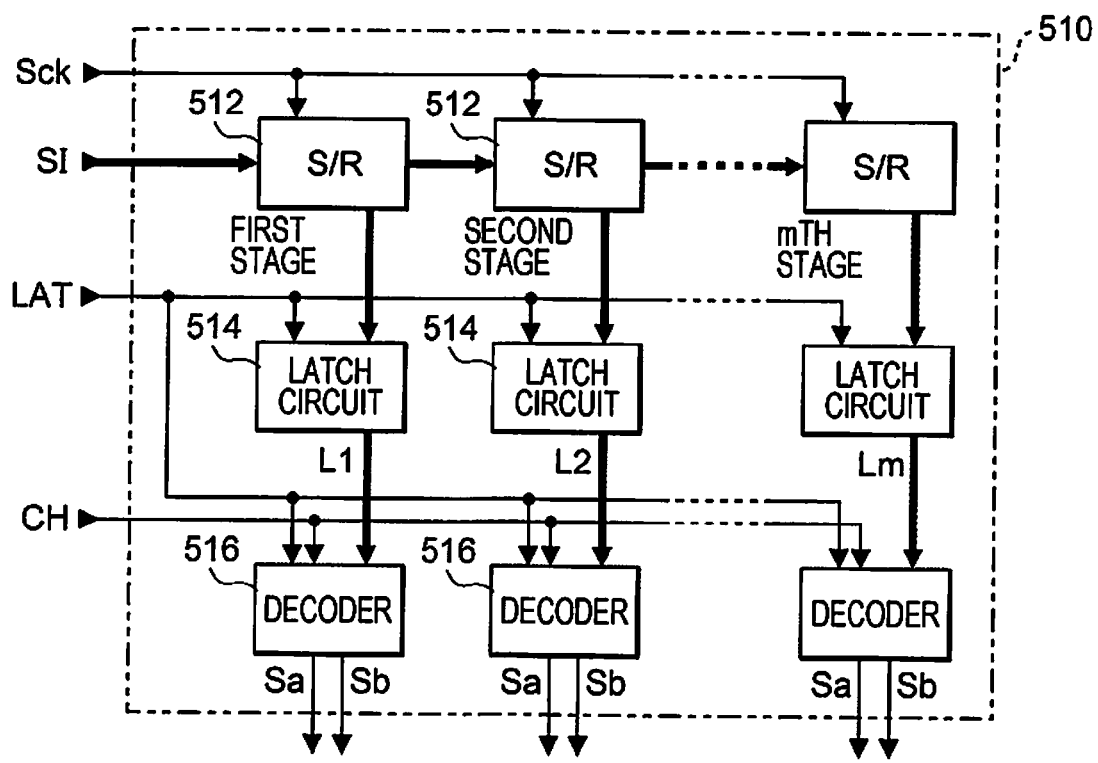
FIG. 6 is a diagram illustrating a configuration of a select control unit.

FIG. 6 is a diagram illustrating a configuration of the select control unit 510 of FIG. 4.

As illustrated in FIG. 6, a clock signal Sck, the print data SI, and the control signals LAT and CH are supplied to the select control unit 510. Multiple sets of a shift register (S/R) 512, a latch circuit 514, and a decoder 516 are provided in correspondence with each of the piezoelectric elements Pzt (nozzles N) in the select control unit 510.

The print data SI is data which defines dots to be formed by all the nozzles N in the head unit 3 which is focused during the print period Ta. In the present embodiment, in order to represent the four gradations of no record, a small dot, a medium dot, and a large dot, the print data for one nozzle is configured by two bits of a most significant bit (MSB) and a least significant bit (LSB).

The print data SI is supplied in accordance with transport of the medium P for each nozzle N (piezoelectric element Pzt) in synchronization with the clock signal Sck. The shift register 512 has a configuration in which the print data SI of two bits is retained once in correspondence with the nozzle N.

In detail, shift registers 512 of total m stages corresponding to each of m piezoelectric elements Pzt (nozzles) are coupled in cascade, and the print data SI which is supplied to the shift register 512 of a first stage located at a left end of FIG. 6 is sequentially transmitted to the rear stage (downward side) in accordance with the clock signal Sck.

In FIG. 6, in order to separate the shift registers 512, the shift register 512 are sequentially referred to as a first stage, a second stage, . . . , an mth stage from an upper side to which the print data SI is supplied.

The latch circuit 514 latches the print data SI retained in the shift register 512 at a rising edge of the control signal LAT.

The decoder 516 decodes the print data SI of two bits which are latched in the latch circuit 514, outputs select signals Sa and Sb for each of periods T1 and T2 which are defined by the control signal LAT and the control signal CH, and defines select of the select unit 520.

Figures 7, 8:
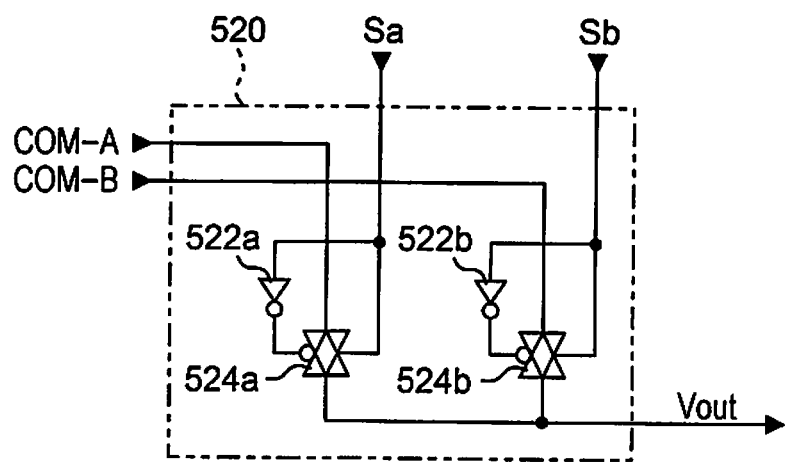
FIG. 7 is a diagram illustrating decoded content of a decoder.
FIG. 8 is a diagram illustrating a configuration of a select unit.

FIG. 7 is a diagram illustrating decoded content of the decoder 516.

In FIG. 7, the print data SI of two bits which are latched is referred to as an MSB and an LSB. In the decoder 516, if the latched print data SI is (0,1), it means that logic levels of the select signals Sa and Sb are respectively output as levels of H and L during the period T1, and levels of L and H during the period T2.

The logic levels of the select signals Sa and Sb are level-shifted by a level shifter (not illustrated) to a higher amplitude logic than the logic levels of the clock signal Sck, the print data SI, and the control signals LAT and CH.

FIG. 8 is a diagram illustrating a configuration of the select unit 520 of FIG. 4.

As illustrated in FIG. 8, the select unit 520 includes inverters (NOT circuit) 522a and 522b, and transfer gates 524a and 524b.

The select signal Sa from the decoder 516 is supplied to a positive control terminal to which a round mark is not attached in the transfer gate 524a, is logically inverted by the inverter 522a, and is supplied to a negative control terminal to which a round mark is attached in the transfer gate 524a. In the same manner, the select signal Sb is supplied to a positive control terminal of the transfer gate 524b, is logically inverted by the inverter 522b, and is supplied to a negative control terminal of the transfer gate 524b.

The drive signal COM-A is supplied to an input terminal of the transfer gate 524a, and the drive signal COM-B is supplied to an input terminal of the transfer gate 524b. The output terminals of the transfer gates 524a and 524b are coupled to each other, and are coupled to one terminal of the corresponding piezoelectric element Pzt.

If the select signal Sa goes to an H level, the input terminal and the output terminal of the transfer gate 524a are electrically coupled (ON) to each other. If the select signal Sa goes to an L level, the input terminal and the output terminal of the transfer gate 524a are electrically decoupled (OFF) from each other. In the same manner, the input terminal and the output terminal of the transfer gate 524b are also electrically coupled to each other or decoupled from each other in accordance with the select signal Sb.

As illustrated in FIG. 5, the print data SI is supplied to each nozzle in synchronization with the clock signal Sck, and is sequentially transmitted to the shift registers 512 corresponding to the nozzles. Thus, if supply of the clock signal Sck is stopped, the print data SI corresponding to each nozzle is retained in each of the shift registers 512.

If the control signal LAT rises, each of the latch circuits 514 latches all of the print data SI retained in the shift registers 512. In FIG. 5, the number in L1, L2, . . . , Lm indicate the print data SI which is latched by the latch circuits 514 corresponding to the shift registers 512 of the first stage, the second stage, . . . , the mth stage.

The decoder 516 outputs the logic levels of the select signals Sa and Sb in the content illustrated in FIG. 7 in accordance with the size of the dots which are defined by the latched print data SI during the periods T1 and T2.

That is, first, the decoder 516 sets the select signals Sa and Sb to levels of H and L during the period T1 and levels of H and L even during the period T2, if the print data SI is (1,1) and the size of the large dot is defined. Second, the decoder 516 sets the select signals Sa and Sb to levels of H and L during the period T1 and levels of L and H during the period T2, if the print data SI is (0,1) and the size of the medium dot is defined. Third, the decoder 516 sets the select signals Sa and Sb to levels of L and L during the period T1 and levels of L and H during the period T2, if the print data SI is (1,0) and the size of the small dot is defined. Fourth, the decoder 516 sets the select signals Sa and Sb to levels of L and H during the period T1 and levels of L and L during the period T2, if the print data SI is (0,0) and no recode is defined.

Figure 9:
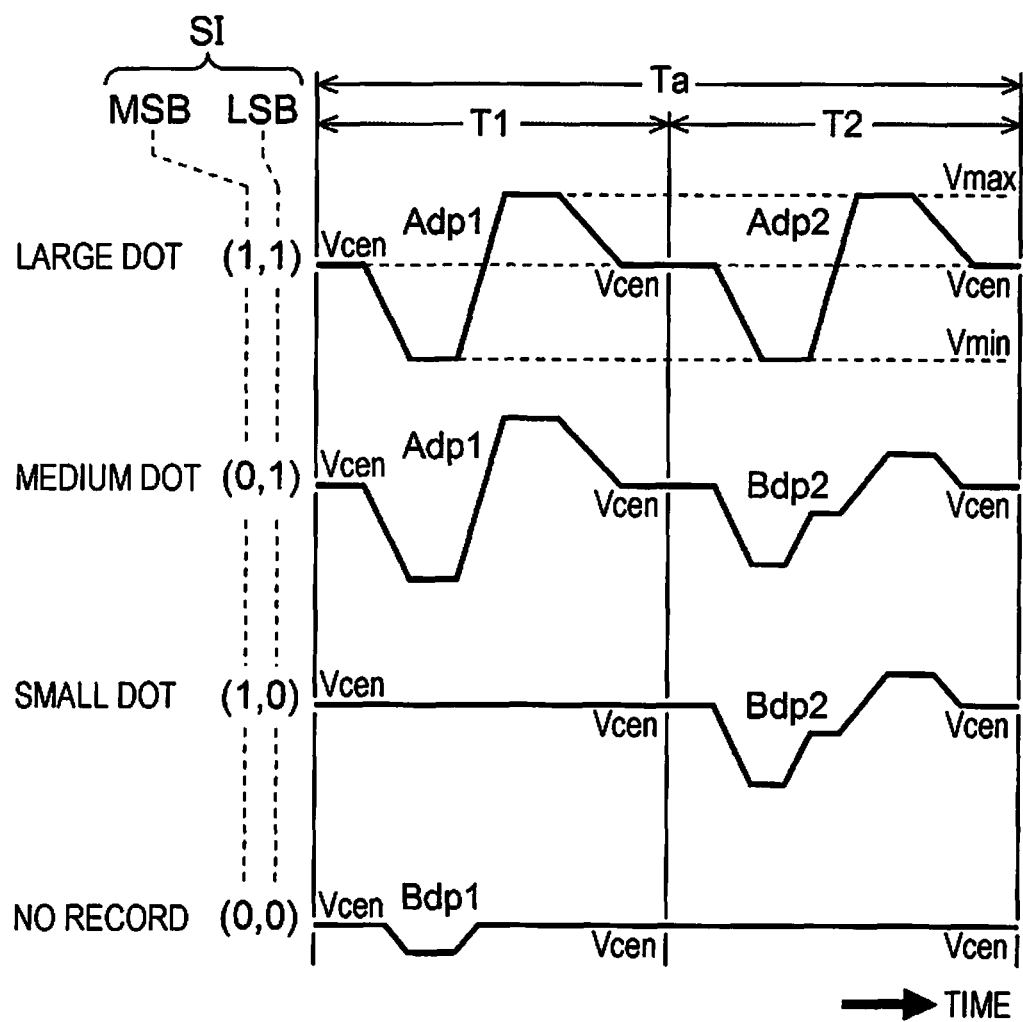
FIG. 9 is a diagram illustrating the drive signals which are supplied from the select unit to a piezoelectric element.

FIG. 9 is a diagram illustrating waveforms of the drive signals which are selected in accordance with the print data SI and are supplied to one terminal of the piezoelectric element Pzt.

When the print data SI is (1,1), the select signals Sa and Sb become H and L levels during the period T1, and thus the transfer gate 524a is turned on, and the transfer gate 524b is turned off. For this reason, the trapezoidal waveform Adp1 of the drive signal COM-A is selected during the period T1. Since the select signals Sa and Sb go to H and L levels even during the period T2, the select unit 520 selects the trapezoidal waveform Adp2 of the drive signal COM-A.

In this way, if the trapezoidal waveform Adp1 is selected during the period T1, the trapezoidal waveform Adp2 is selected during the period T2, and the selected waveforms are supplied to one terminal of the piezoelectric element Pzt as drive signals, ink of an approximately medium amount is ejected twice from the nozzle N corresponding to the piezoelectric element Pzt. For this reason, each ink is landed on and combined with the medium P, and as a result, a large dot is formed as defined by the print data SI.

When the print data SI is (0,1), the select signals Sa and Sb become H and L levels during the period T1, and thus the transfer gate 524a is turned on, and the transfer gate 524b is turned off. For this reason, the trapezoidal waveform Adp1 of the drive signal COM-A is selected during the period T1. Next, since the select signals Sa and Sb go to L and H levels during the period T2, the trapezoidal waveform Bdp2 of the drive signal COM-B is selected.

Hence, ink of an approximately medium amount and an approximately small amount is ejected twice from the nozzle N. For this reason, each ink is landed on and combined with the medium P, and as a result, a medium dot is formed as defined by the print data SI.

When the print data SI is (1,0), the select signals Sa and Sb become all L levels during the period T1, and thus the transfer gates 524a and 524b are turned off. For this reason, the trapezoidal waveforms Adp1 and Bdp1 are not selected during the period T1. If the transfer gates 524a and 524b are all turned off, a path from a coupling point of the output terminals of the transfer gates 524a and 524b to one terminal of the piezoelectric element Pzt becomes a high impedance state in which the path is not electrically coupled to any portion. However, both terminals of the piezoelectric element Pzt retain a voltage (Vcen-$V_{BS}$) shortly before the transfer gates are turned off, by capacitance included in the piezoelectric element Pzt itself.

Next, since the select signals Sa and Sb go to L and H levels during the period T2, the trapezoidal waveform Bdp2 of the drive signal COM-B is selected. For this reason, ink of an approximately small amount is ejected from the nozzle N only during the period T2, and thus small dot is formed on the medium P as defined by the print data SI.

When the print data SI is (0,0), the select signals Sa and Sb become L and H levels during the period T1, and thus the transfer gates 524a is turned off and the transfer gate 524b is turned on. For this reason, the trapezoidal waveforms Bdp1 of the drive signal COM-B is selected during the period T1. Next, since all of the select signals Sa and Sb go to L levels during the period T2, the trapezoidal waveforms Adp2 and Bdp2 are all not selected.

For this reason, ink near the nozzle N just slightly vibrates during the period T1, and the ink is not ejected, and thus, as a result, dots are not formed, that is, no record is made as defined by the print data SI.

In this way, the select unit 520 selects (or does not select) the drive signals COM-A and COM-B in accordance with instruction of the select control unit 510, and applies the selected signal to one terminal of the piezoelectric element Pzt. For this reason, each of the piezoelectric elements Pzt is driven in accordance with the size of the dot which is defined by the print data SI.

The drive signals COM-A and COM-B illustrated in FIG. 5 are just an example. Actually, combinations of various waveforms which are prepared in advance are used in accordance with properties, transport speed, or the like of the medium P.

In addition, here, an example in which the piezoelectric element Pzt is bent upwardly in accordance with a decrease of a voltage is used, but if a voltage which is applied to the drive electrodes 72 and 76 is inverted, the piezoelectric element Pzt is bent downwardly in accordance with a decrease of the voltage. For this reason, in a configuration in which the piezoelectric element Pzt is bent downwardly in accordance with a decrease of a voltage, the drive signals COM-A and COM-B illustrated in the figure have waveforms which are inverted by using the voltage Vcen as a reference.

Next, the drive circuits 120a and 120b of the main substrate 100 will be described.

The drive circuits 120a and 120b are the same configuration as each other except signals which are input and signals which are output. Hence, for the drive circuit, the drive circuit 120a on a side which outputs the drive signal COM-A will be described as an example.

Figure 10:
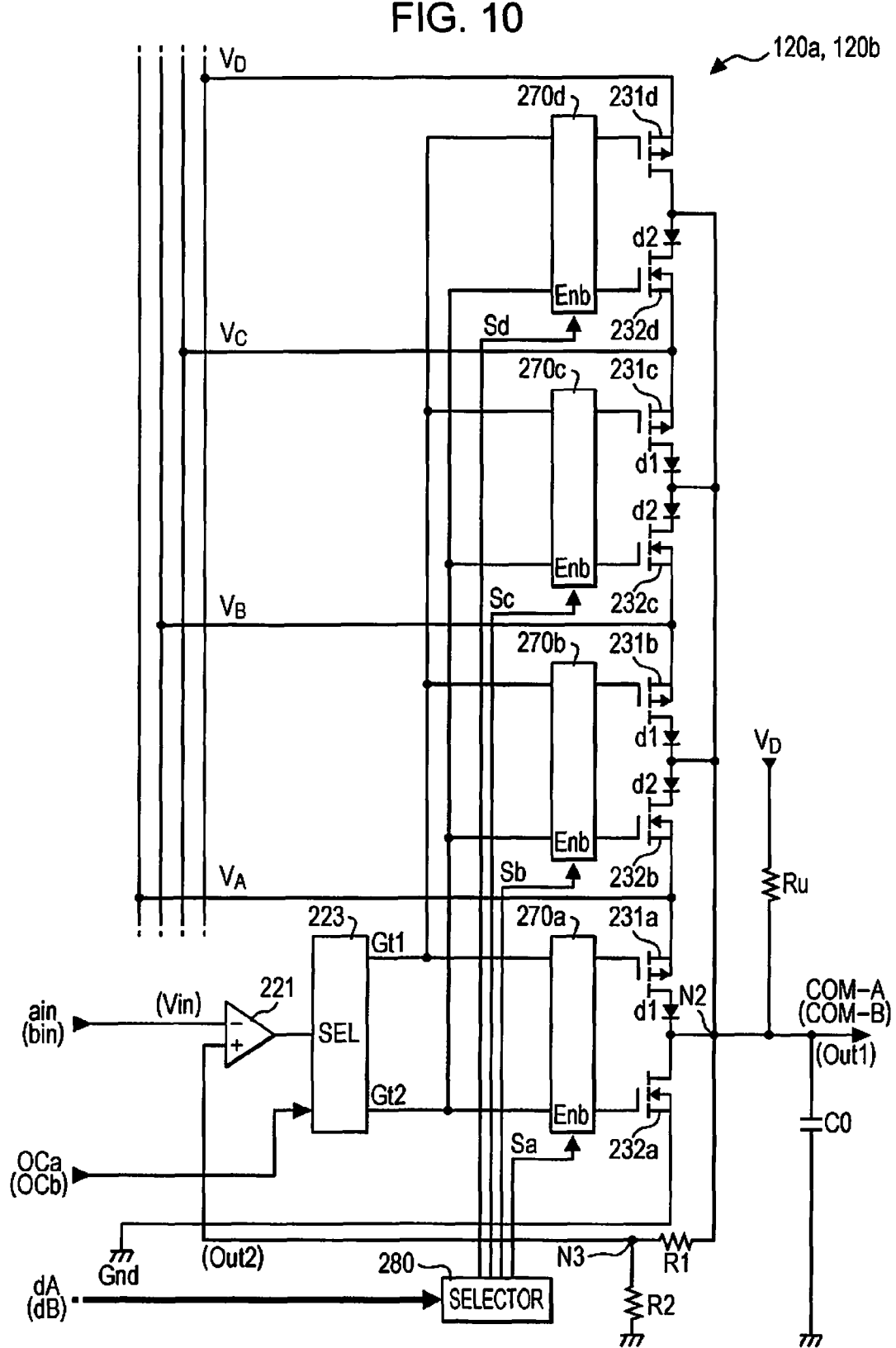
FIG. 10 is a diagram illustrating a configuration of the drive circuit.

FIG. 10 is a diagram illustrating a configuration of the drive circuit 120a.

As illustrated in this figure, the drive circuit 120a includes a differential amplifier 221, a selector 223, gate selectors 270a, 270b, 270c, and 270d, a selector 280, four pairs of transistors, resistance elements Ru, R1, and R2, and a capacitor C0.

In addition, the drive circuit 120a uses the voltages $V_A$, $V_B$, $V_C$, and $V_D$ which are generated by the auxiliary power supply circuit 117.

Figure 11:
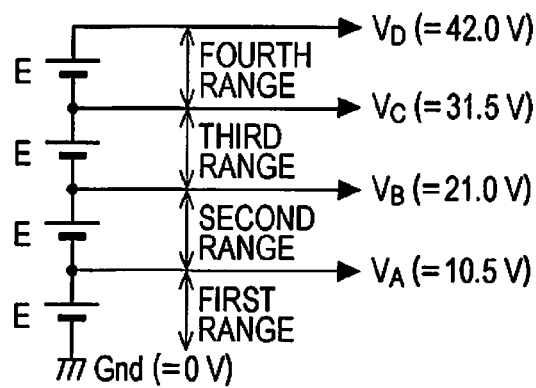
FIG. 11 is a diagram illustrating an operation of the drive circuit.

FIG. 11 is a diagram illustrating the voltages $V_A$, $V_B$, $V_C$, and $V_D$.

As described in this figure, the auxiliary power supply circuit 117 has a configuration in which voltages E, 2E, 3E, and 4E which are obtained by serially coupling reference power supplies, each outputting, for example, a voltage E, in four stages are respectively output as voltages $V_A$, $V_B$, $V_C$, and $V_D$.

Here, when the voltage E is set to, for example, 10.5 V, the voltages $V_A$, $V_B$, $V_C$, and $V_D$ are respectively 10.5 V, 21.0 V, 31.5 V, and 42.0 V.

In the present embodiment, the following voltage ranges are defined in accordance with the voltages $V_A$, $V_B$, $V_C$, and $V_D$, that is, a range higher than or equal to the ground Gnd of zero volts and lower than the voltage $V_A$ is defined as a first range, a range higher than or equal to the voltage $V_A$ and lower than the voltage $V_B$ is defined as a second range, a range higher than or equal to the voltage $V_B$ and lower than the voltage $V_C$ is defined as a third range, and a range higher than or equal to the voltage $V_C$ and lower than the voltage $V_D$ is defined as a fourth range.

Returning to the description of FIG. 10, the signal ain is supplied to a negative input terminal (−) of the differential amplifier 221, and Meanwhile, a voltage Out2 of a node N3 is applied to a positive input terminal (+) thereof. Here, if a voltage of the signal ain is referred to as a voltage Vin, the differential amplifier 221 amplifies a difference voltage which is obtained by subtracting the voltage Vin of the signal ain with a small amplitude which is an input from the voltage Out2, and outputs the amplified voltage.

In addition, while not illustrated, in the differential amplifier 221, for example, a low side of the power supplies is referred to as a ground Gnd, and a high side of the power supplies is referred to as $V_A$. For this reason, an output voltage of the differential amplifier 221 is within a range from the ground Gnd to the voltage $V_A$. The power supplies of the differential amplifier 221 are not limited to this, and may use a low voltage such as 3.3 V.

The selector 280 discriminates a range of the voltage Vin of the signal ain, based on the data dA which is supplied from the control unit 110 (refer to FIG. 4), and outputs select signals Sa, Sb, Sc, and Sd in accordance with the discrimination result as follows.

In detail, in a case where the voltage Vin which is defined by the data dA is discriminated to be higher than or equal to 0 V and lower than 1.05 V, that is, in a case where a voltage at the time of amplifying the voltage Vin by 10 times is included in the first range, the selector 280 sets only the select signal Sa to an H level, and sets the other select signals Sb, Sc, and Sd to an L level.

In addition, in a case where the voltage Vin which is defined by the data dA is discriminated to be higher than or equal to 1.05 V and lower than 2.10 V, that is, in a case where a voltage at the time of amplifying the voltage Vin by 10 times is included in the second range, the selector 280 sets only the select signal Sb to an H level, and sets the other select signals Sa, Sc, and Sd to an L level.

In the same manner, in a case where the voltage Vin which is defined by the data dA is discriminated to be higher than or equal to 2.10 V and lower than 3.15 V, that is, in a case where a voltage at the time of amplifying the voltage Vin by 10 times is included in the third range, the selector 280 sets only the select signal Sc to an H level, and sets the other select signals Sa, Sb, and Sd to an L level. In a case where the voltage Vin is discriminated to be higher than or equal to 3.15 V and lower than 4.20 V, that is, in a case where a voltage at the time of amplifying the voltage Vin by 10 times is included in the fourth range, the selector 280 sets only the select signal Sd to an H level, and sets the other select signals Sa, Sb, and Sc to an L level.

The drive circuit 120*b* discriminates a range of the voltage Vin of the signal bin, based on the data dB and outputs the select signals Sa, Sb, Sc, and Sd in the same manner in accordance with the discriminated results.

Here, for the sake of convenient description, four pairs of transistors will be described.

In the example, the four pairs of transistors are configured by a pair of transistors 231*a* and 232*a*, a pair of transistors 231*b* and 232*b*, a pair of transistors 231*c* and 232*c*, and a pair of transistors 231*d* and 232*d*.

Among the respective pairs of transistors, the transistors 231*a*, 231*b*, 231*c*, an 231*d* on a high side are, for example, P-channel field effect transistors, and the transistors 232*a*, 232*b*, 232*c*, an 232*d* on a low side are, for example, N-channel field effect transistors.

In the transistor 231*a*, the voltage $V_A$ is applied to a source terminal thereof, and a drain terminal thereof is coupled to the node N2. In the transistor 232*a*, a source terminal thereof is coupled to the ground Gnd, and a drain terminal thereof is coupled to the node N2 in common.

In the same manner, in the transistor 231*b* (231*c*, 231*d*), the voltage $V_B$ ($V_C$, $V_D$) is applied to a source terminal thereof, and a drain terminal thereof is coupled to the node N2. In the transistor 232*b* (232*c*, 232*d*), the voltage $V_A$ ($V_B$, $V_C$) is applied to a source terminal thereof, and a drain terminal thereof is coupled to the node N2 in common.

While detailed description will be made below, when the gate selector 270*a* is enabled, the transistors 231*a* and 232*a* output drive signals by using the voltage $V_A$ and the ground Gnd as power supply voltages, and when the gate selector 270*b* is enabled, the transistors 231*b* and 232*b* output drive signals by using the voltage $V_B$ and the voltage $V_A$ as power supply voltages. In the same manner, when the gate selector 270*c* is enabled, the transistors 231*c* and 232*c* output drive signals by using the voltage $V_C$ and the voltage $V_B$ as power supply voltages, and when the gate selector 270*d* is enabled, the transistors 231*d* and 232*d* output drive signals by using the voltage $V_D$ and the voltage $V_C$ as power supply voltages.

In the aforementioned configuration, the power supply voltage of the transistors 231*a* and 232*a*, the power supply voltage of the transistors 231*b* and 232*b*, the power supply voltage of the transistors 231*c* and 232*c*, and the power supply voltage of the transistors 231*d* and 232*d* are all 10.5 V.

For example, in a case where the transistors 231*a* and 232*a* are referred to as a first pair of transistors, the transistors 231*b* and 232*b* become a second pair of transistors, and the first pair of transistors and the second pair of transistors are electrically coupled in series to each other.

When the select signal Sa which is supplied to an input terminal Enb is enabled to an H level, the gate selector 270*a* level-shifts the signals Gt1 and Gt2 which are output from the selector 223, and supplies the shifted signals to gate terminals of the transistors 231*a* and 232*a*, respectively.

In detail, when being enabled, the gate selector 270*a* level-shifts a range from a minimum voltage to a maximum voltage of the signal Gt1 into the first range from the ground Gnd to the voltage $V_A$, supplies the shifted signal to the gate terminal of the transistor 231*a*, level-shifts a range from a minimum voltage to a maximum voltage of the signal Gt2 into the first range, and supplies the shifted signal to the gate terminal of the transistor 232*a*. For this reasons, while not illustrated in particular, the gate selector 270*a* is configured to use, for example, the voltages $V_A$ and Gnd as power supplies.

If description is made to be limited to the gate selector 270*a*, a range from minimum voltages to maximum voltages of the signals Gt1 and Gt2 coincides with the first range, and thus, when being enabled, the signals Gt1 and Gt2 are respectively supplied to the gate terminals of the transistors 231*a* and 232*a* as they are.

In addition, in a case where the power supply of the differential amplifier 221 is set to a low voltage, when being enabled, the gate selector 270*a* level-shifts ranges from the minimum voltage of 0 V to the maximum voltage of 3.3 V of the signals Gt1 and Gt2 into the first range and supplies the sifted signals to the transistors 231*a* and 232*a*.

When being enabled, the gate selector 270*b* level-shifts the range from the minimum voltage to the maximum voltage of the signal Gt1 into the second range from the voltage $V_A$ to the voltage $V_B$, supplies the shifted signal to the gate terminal of the transistor 231b, level-shifts the range from the minimum voltage to the maximum voltage of the signal Gt2 into the second range, and supplies the shifted signal to the gate terminal of the transistor 232b. For this reasons, while not illustrated in particular, the gate selector 270b is configured to use, for example, the voltages $V_B$ and $V_A$ as power supplies.

If description is made to be limited to the gate selector 270b, when being enabled, 10.5 V is added to the signals Gt1 and Gt2 and the signals are supplied to the gate terminals of the transistors 231b and 232b.

In addition, in a case where the power supply of the differential amplifier 221 is set to a low voltage, when being enabled, the gate selector 270b level-shifts ranges from the minimum voltage of 0 V to the maximum voltage of 3.3 V of the signals Gt1 and Gt2 into the second range and supplies the sifted signals to gate terminals of the transistors 231b and 232b.

In the same manner, when being enabled, the gate selector 270c level-shifts the range from the minimum voltage to the maximum voltage of the signal Gt1 into the third range from the voltage $V_B$ to the voltage $V_C$, supplies the shifted signal to the gate terminal of the transistor 231c, level-shifts the range from the minimum voltage to the maximum voltage of the signal Gt2 into the third range, and supplies the shifted signal to the gate terminal of the transistor 232c. For this reasons, while not illustrated in particular, the gate selector 270c is configured to use, for example, the voltages $V_C$ and $V_B$ as power supplies.

If description is made to be limited to the gate selector 270c, when being enabled, 21.0 V is added to the signals Gt1 and Gt2 and the signals are respectively supplied to the gate terminals of the transistors 231c and 232c.

In addition, in a case where the power supply of the differential amplifier 221 is set to a low voltage, when being enabled, the gate selector 270c level-shifts ranges from the minimum voltage of 0 V to the maximum voltage of 3.3 V of the signals Gt1 and Gt2 into the third range and supplies the sifted signals to the gate terminals of the transistors 231c and 232c.

In the same manner, when being enabled, the gate selector 270d level-shifts the range from the minimum voltage to the maximum voltage of the signal Gt1 into the fourth range from the voltage $V_C$ to the voltage $V_D$, supplies the shifted signal to the gate terminal of the transistor 231d, level-shifts a range from the minimum voltage to the maximum voltage of the signal Gt2 into the fourth range, and supplies the shifted signal to the gate terminal of the transistor 232d. For this reasons, while not illustrated in particular, the gate selector 270d is configured to use, for example, the voltages $V_D$ and $V_C$ as power supplies.

If description is made to be limited to the gate selector 270d, when being enabled, 31.5 V is added to the signals Gt1 and Gt2 and the signals are respectively supplied to the gate terminals of the transistors 231d and 232d.

In addition, in a case where the power supply of the differential amplifier 221 is set to a low voltage, when being enabled, the gate selector 270d level-shifts ranges from the minimum voltage of 0 V to the maximum voltage of 3.3 V of the signals Gt1 and Gt2 into the fourth range and supplies the sifted signals to gate terminals of the transistors 231d and 232d.

When the select signals which are supplied to the input terminals Enb are disabled to an L level, the gate selectors 270a, 270b, 270c, and 270d output signals which respectively turn off two transistors corresponding thereto. That is, if being disabled, the gate selectors 270a, 270b, 270c, and 270d forcibly changes the signal Gt1 to an H level, and forcibly changes the signal Gt2 to an L level.

Here, the H level and the L level are respectively a high side voltage and a low side voltage of the power supply voltages of each of the gate selectors 270a, 270b, 270c, and 270d. For example, the gate selector 270b uses the voltage $V_B$ and the voltage $V_A$ as a power supply voltage thereof, and thus, the voltage $V_B$ on a high side is an H level, and a voltage $V_A$ on a low side is an L level.

The node N2 is fed back to the positive input terminal (+) of the differential amplifier 221 through the resistance element R1. In this example, for the sake of convenience, a voltage of the node N2 is referred to as Out1 and the positive input terminal (+) of the differential amplifier 221 is referred to as the node N3, and a voltage of the node N3 is referred to as Out2.

The node N3 is coupled to the ground Gnd through the resistance element R2. For this reason, the voltage Out2 of the node N3 is obtained by dividing a voltage of the voltage Out by a ratio which is defined by resistance values of the resistance elements R1 and R2, that is, R2/(R1+R2). In the present embodiment, a drop ratio is set to 1/10. In other words, the voltage Out2 is in a relationship of 1/10 of the voltage Out.

The node N2 is pulled up to the voltage $V_D$ through the resistance element Ru. In addition, it can also be said that the node N2 is pulled down through the resistance elements R1 and R2.

The capacitor C0 is provided for preventing abnormal oscillation, one terminal thereof is coupled to the node N2, and the other terminal thereof is coupled to a constant potential, for example, the ground Gnd.

Diodes d1 and d2 of each pair of transistors are used for blocking reverse currents. A forward direction of the diode d1 is a direction toward the node N2 from the drain terminals of the transistors 231a, 231b, and 231c, and a forward direction of the diode d2 is a direction toward the drain terminals of the transistors 231b, 231c, and 231d from the node N2.

The voltage Out of the node N2 is not higher than the voltage $V_D$, and thus, it is not necessary to consider a reverse current. For this reason, the diode d1 is not provided for the transistor 231d. In the same manner, the voltage Out of the node N2 is not lower than the ground Gnd of zero volts, and thus, the diode d2 is not provided for the transistor 232a.

An operation of the drive circuit 120a will be described.

Figure 12:
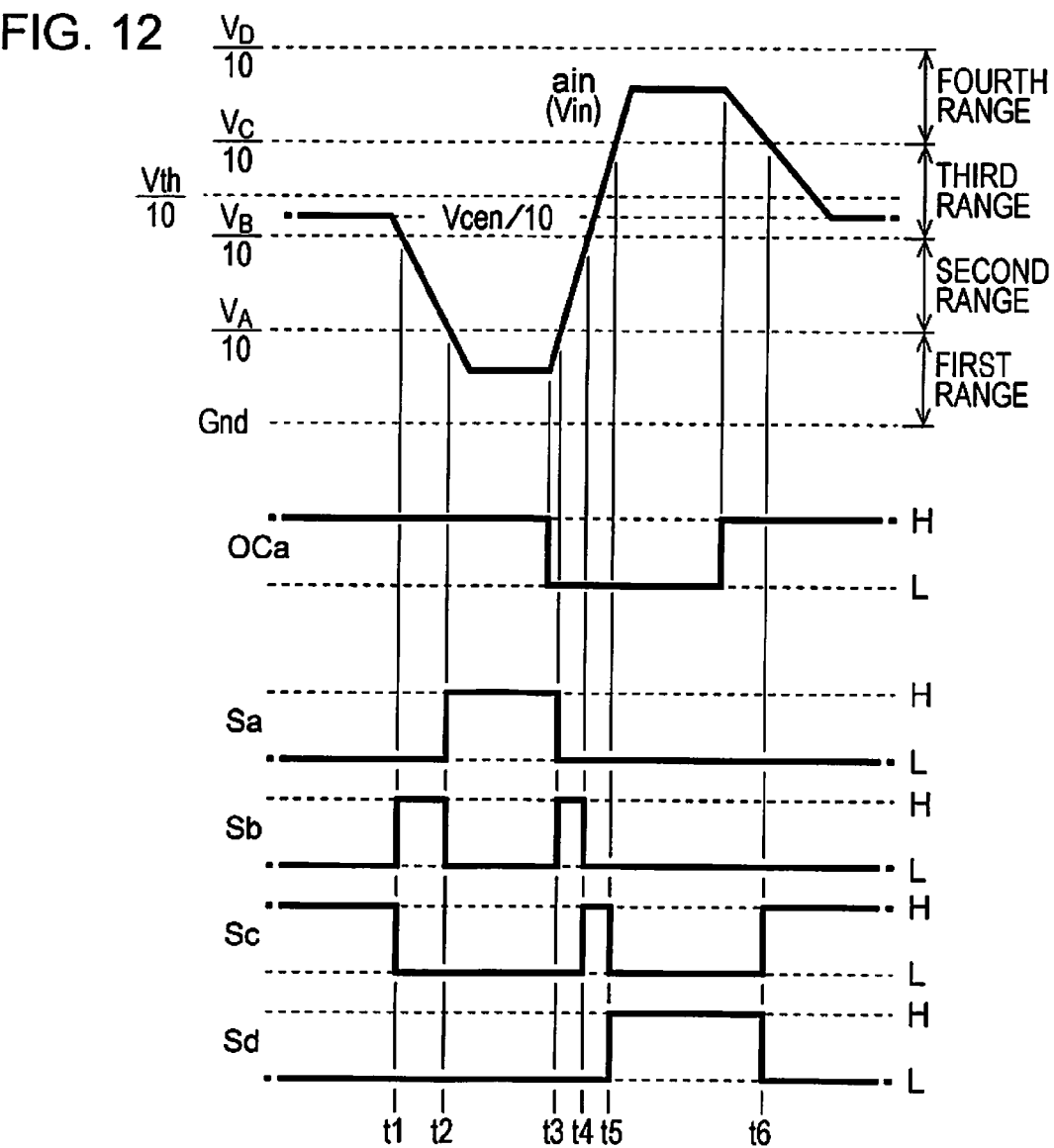
FIG. 12 is a diagram illustrating the operation of the drive circuit.

FIG. 12 is a diagram illustrating the operation of the drive circuit 120a. As described above, a waveform of the signal ain is different from a waveform of the drive signal COM-A, and the voltage Vin of the signal ain is in a relationship of 1/10 of the voltage Out1 of the drive signal COM-A.

For this reason, in a case where the first range to the fourth range which are defined by the voltages $V_A$, $V_B$, $V_C$, and $V_D$ are converted into a voltage range of the signal ain, the ranges are defined by the voltages $V_A/10$, $V_B/10$, $V_C/10$, and $V_D/10$. In detail, in the signal ain, a range higher than or equal to 0 V and lower than $V_A/10$ (=1.05 V) corresponds to the first range, a range higher than or equal to $V_A/10$ and lower than $V_B/10$ (=2.10 V) corresponds to the second range, a range higher than or equal to $V_B/10$ and lower than $V_C/10$ (=3.15 V) corresponds to the third range, and a range higher than or equal to $V_C/10$ and lower than $V_D/10$ (=4.20 V) corresponds to the fourth range.

First, in a case where the voltage Vin is discriminated from the data dA to be in the third range during a period prior to timing t1, the selector 280 sets only the select signal Sc to an H level, and sets the other select signals Sa, Sb, and Sd to an L level. For this reasons, the gate selector 270c is enabled, and the other gate selectors 270a, 270b, and 270d are disabled. Hence, in this case, the transistors 231c and 232c output the drive signal COM-A by using the voltages $V_C$ and $V_B$ as power supply voltages.

Next, when the voltage Vin is in the second range during a period from timing t1 to timing t2, the selector 280 sets only the select signal Sb to an H level, and sets the other select signals Sa, Sc, and Sd to an L level, and thereby the gate selector 270b is enabled, and the other gate selectors 270a, 270c, and 270d are disabled. Hence, in this case, the transistors 231b and 232b output the drive signal COM-A by using the voltages $V_B$ and $V_A$ as power supply voltages.

When the voltage Vin is in the first range during a period from timing t2 to timing t3, the selector 280 sets only the select signal Sa to an H level, and as a result, only the gate selector 270a is enabled, and thereby the transistors 231a and 232a output the drive signal COM-A by using the voltages $V_A$ and the ground Gnd as power supply voltages.

The subsequent operations will be briefly described. Since only the gate selector 270b is enabled during a period from timing t3 to timing t4, the transistors 231b and 232b use the voltages $V_B$ and $V_A$ as power supply voltages. Since only the gate selector 270c is enabled during a period from timing t4 to timing t5, the transistors 231c and 232c use the voltages $V_C$ and $V_B$ as power supply voltages. Since only the gate selector 270d is enabled during a period from timing t5 to timing t6, the transistors 231d and 232d use the voltages $V_D$ and $V_C$ as power supply voltages. Since only the gate selector 270c is enabled from timing t6, the transistors 231c and 232c use the voltages $V_C$ and $V_B$ as power supply voltages. By doing so, each transistor outputs the drive signal COM-A.

Meanwhile, the voltage Out2 of the node N3 is 1/10 of the voltage Out, and thus, in order to obtain the difference voltage, both scales are aligned.

In the drive circuit 120a, any one of the gate selectors 270a, 270b, 270c, and 270d is enabled in accordance with the voltage Vin of the signal ain, and thereby, an operation in which the voltage Out2 that is obtained by dropping the voltage Out by 1/10 follows the voltage Vin, in other words, an operation in which the voltage Out is amplified by 10 times the voltage Vin is performed by the pair of transistors corresponding to the enabled gate selector.

For example, in a case where the voltage Vin corresponds to the first range, the gate selector 270a is enabled, and thereby, the operation in which the voltage Out2 follows the voltage Vin is performed by the transistors 231a and 232a. In the same manner, in a case where the voltage Vin corresponds to the second range, the gate selector 270b is enabled, and thereby, the operation in which the voltage Out2 follows the voltage Vin is performed by the transistors 231b and 232b. In a case where the voltage Vin corresponds to the third range, the gate selector 270c is enabled, and thereby, the operation in which the voltage Out2 follows the voltage Vin is performed by the transistors 231c and 232c. In a case where the voltage Vin corresponds to the fourth range, the gate selector 270d is enabled, and thereby, the operation in which the voltage Out2 follows the voltage Vin is performed by the transistors 231d and 232d.

There is a case where the voltage yin of the signal ain crosses (transition) adjacent regions in the first range to the fourth range. For example, referring to FIG. 12, transition of the voltage yin from the third range to the second range is performed at timing t1. If the voltage Vin is in the third range, the gate selector 270c is enabled, and thereby, the voltage Out is controlled to be 10 times the voltage Vin by the transistors 231c and 232c. When transition of the voltage Vin from the third range to the second range is performed at the timing t1, the gate selector 270c is disabled, the gate selector 270b is enabled, and thereby, the voltage Out2 is controlled to follow the voltage Vin by the transistors 231b and 232b.

Here, a case where the transition of the voltage Vin from the third range to the second range is performed is described as an example, but other cases are the same, and for example, if transition from the second range to the first range is performed, the gate selector 270b is disabled, the gate selector 270a is enabled, and thereby, the subsequent voltage Out2 is controlled to follow the voltage Vin by the transistors 231a and 232a.

Next, control of making the voltage Out2 follow the voltage Vin using any one pair of transistors will be described.

In the drive circuit 120a, any one of the gate selectors 270a, 270b, 270c, and 270d is enabled in accordance with the voltage Vin of the signal ain, but the enabled gate selector operates in any one of the following four cases, if the drive signal has a trapezoidal waveform.

That is, there are a case where (first case) the voltage Vout of the signal ain decreases, a case where (second case) the voltage Vout of the signal ain is constant at a voltage lower than the threshold value Vth, a case where (third case) the voltage Vout of the signal ain increases, and a case where (fourth case) the voltage Vout of the signal ain is constant at a voltage higher than or equal to the threshold value Vth.

If description is made with reference to the waveform of the drive signal COM-A illustrated in FIG. 12, the gate selector 270a has the first case, the second case, and the third case and does not have the fourth case, the gate selector 270b has the first case and the third case and does not have the second case and the fourth case, the gate selector 270c has the first case, the second case, and the third case and does not have the fourth case, and the gate selector 270d has the first case, the third case, and the fourth case and does not have the second case.

Next, an operation of a pair of transistors corresponding to the enabled gate selector will be described. Here, the enabled gate selector is not specified, and is described in a general sense. For this reasons, in the pair of transistors corresponding to the enabled gate selector, a reference numeral of a transistor on a high side is set to 231, and a reference numeral of a transistor on a low side is set to 232.

First, the first case where the voltage of the signal ain (COM-A) decreases will be described.

In the first case, the signal OCa is in an H level, and thereby, the selector 223 selects an H level as the signal Gt1 and selects a signal which is output from the differential amplifier 221 as the signal Gt2.

In addition, in the first case, the voltage Vin of the signal ain decreases prior to the voltage Out2 of the node N3. In other words, the voltage Out2 is higher than or equal to the voltage Vin. For this reasons, a voltage of the output signal of the differential amplifier 221 which is selected as the signal Gt2 increases in accordance with a difference voltage between both voltages, and swings approximately to an H level. If the signal Gt2 goes to an H level, the N-channel transistor 232 is turned on, and thereby, the voltage Out2 decreases. The voltage Out2 of the node N3 is 1/10 of the voltage Out1 of the node N2, but actually, is slowly decreased by the capacitor C0, the piezoelectric element Pzt with capacitance, or the like, without being immediately decreased to a low side voltage of the power supply.

If the voltage Out2 decreases to be lower than the voltage Vin, the signal Gt2 goes to an L level and the transistor 232 is turned off, but since the voltage Vin decreases, the voltage Out2 increases to be higher than or equal to the voltage Vin again. For this reasons, the signal Gt2 goes to an H level, and the transistor 232 is turned on again.

In the first case, the signal Gt2 is alternately switched to an H level and an L level, and thereby, the transistor 232 performs a repetitive operation of turn-on and turn-off, that is, a switching operation. The control of making the voltage Out2 follow the voltage Vin (such that the voltage Out1 is 10 times the voltage Vin) is performed by the switching operation.

In the first case, the selector 223 selects an H level as the signal Gt1, and thereby, the P-channel transistor 231 is turned off.

Next, the second case where the signal ain (COM-A) is constant at a voltage lower than the threshold value Vth will be described.

In the second case, the signal OCa is in an H level, and thereby, the selector 223 selects an H level as the signal Gt1 and selects the signal which is output from the differential amplifier 221 as the signal Gt2, in the same manner as in the first case.

In the second case, if the voltage Out2 is higher than the voltage Vin, a voltage of the signal Gt2 also increases, and thereby, resistance between a source and a drain of the transistor 232 decreases and the voltage Out2 decreases. Meanwhile, if the voltage Out2 is lower than the voltage Vin, the voltage of the signal Gt2 also decreases, and thereby, resistance between a source and a drain of the transistor 232 increases and the voltage Out2 increases.

Hence, in the second case, the voltage Out2 keeps a balance between a direction in which the voltage Out2 increases and a direction in which the voltage Out2 decreases, that is, balances to coincide with the voltage Vin which is constant. At this time, the signal Gt2 balances to a voltage in which the voltage Out2 becomes the voltage Vin, and thereby, the transistor 232 performs a linear operation.

Subsequently, the third case where the voltage of the signal ain (COM-A) increases will be described.

In the third case, the signal OCa is in an L level, and thereby, the selector 223 selects a signal which is output from the differential amplifier 221 as the signal Gt1 and selects an L level as the signal Gt2.

In addition, in the third case, the voltage Vin of the signal ain increases prior to the voltage Out2 of the node N3. In other words, the voltage Out2 is lower than the voltage Vin. For this reasons, the voltage of the output signal of the differential amplifier 221 which is selected as the signal Gt1 decreases in accordance with a difference voltage between both voltages, and swings approximately to an L level. If the signal Gt1 goes to an L level, the P-channel transistor 231 is turned on, and thereby, the voltage Out2 increases. Actually, the voltage Out2 is slowly increased by the capacitor C0, the piezoelectric element Pzt with capacitance, or the like, without being immediately increased to a high side voltage of the power supply.

If the voltage Out2 increases to be higher than or equal to the voltage Vin, the signal Gt2 goes to an H level and the transistor 231 is turned off, but since the voltage Vin increases, the voltage Out2 increases to be lower than the voltage Vin again. For this reasons, the signal Gt2 goes to an L level, and the transistor 231 is turned on again.

In the third case, the signal Gt1 is alternately switched to an H level and an L level, and thereby, the transistor 231 performs a switching operation. The control of making the voltage Out2 follow the voltage Vin is performed by the switching operation.

In the third case, the selector 223 selects an L level as the signal Gt2, and thereby, the N-channel transistor 232 is turned off.

The fourth case where the signal ain (COM-A) is constant at a voltage higher than or equal to the threshold value Vth will be described.

In the fourth case, the signal OCa is in an L level, and thereby, the selector 223 selects the signal which is output from the differential amplifier 221 as the signal Gt1 and selects an L level as the signal Gt2, in the same manner as in the third case.

In the fourth case, if the voltage Out2 is lower than the voltage Vin, a voltage of the signal Gt1 also decreases, and thereby, resistance between a source and a drain of the transistor 231 decreases and the voltage Out2 increases. Meanwhile, if the voltage Out2 is higher than the voltage Vin, the voltage of the signal Gt1 also increases, and thereby, resistance between a source and a drain of the transistor 231 increases and the voltage Out2 decreases.

Hence, in the fourth case, the voltage Out2 keeps a balance between a direction in which the voltage Out2 increases and a direction in which the voltage Out2 decreases, that is, balances to coincide with the voltage Vin which is constant. At this time, the signal Gt1 balances to a voltage in which the voltage Out2 becomes the voltage Vin, and thereby, the transistor 231 performs a linear operation.

Any one of the gate selectors 270a, 270b, 270c, and 270d is enabled by the selector 280 in accordance with the voltage Vin of the signal ain, and a pair of transistors corresponding to the enabled gate selector operates in any one of the first to the fourth case.

Here, pull-up and pull-down of the node N2 will be described.

Referring to the aforementioned cases, a case where pull-up is required is the second case, that is, a case where the transistor 232 on a low side performs a linear operation. In this case, the transistor 231 on a high side is turned off, and thereby, it is necessary to pull up the node N2 toward a high side so as to increase the voltage Out of the node N2 by using the transistor 232 on a low side.

Meanwhile, referring to the aforementioned cases, a case where pull-down is required is the fourth case, that is, a case where the transistor 231 on a high side performs a linear operation. In this case, the transistor 232 on a low side is turned off, and thereby, it is necessary to pull down the node N2 toward a low side so as to decrease the voltage Out of the node N2 by using the transistor 231 on a high side.

Here, the drive circuit 120a which outputs the drive signal COM-A is described as an example, but the drive circuit 120b which outputs the drive signal COM-B also outputs the drive signal COM-B of the voltage Vout which follows the voltage of the signal bin.

Each of the drive circuits 120a and 120b includes four pairs of transistors, but the pair of transistors to be enabled is only one pair all the time, and the other pairs of transistors are disabled. In addition, in the pair of transistors which is enabled, only one of the transistor on a high side and a transistor on a low side performs a switching operation. For this reasons, according to the present embodiment, it is possible to reduce power which is consumed by the switching operation, compared with D-class amplification in which switching is continuously performed.

In addition, the D-class amplification requires a low pass filter (LPF) which demodulates a switching signal, particularly, an inductor such as a coil, but the drive circuits 120a and 120b does not require the LPF. For this reasons, according to the present embodiment, it is possible to reduce power which is consumed by the LPF, and in addition, to simplify and miniaturize a circuit.

The drive signal COM-A (COM-B) is not limited to a trapezoidal waveform, and may be a waveform with a continuous slope, such as a sine wave. In a case where such a waveform is output, if a change of the voltage Vout (voltage Vin of the signal ain) of the drive signal COM-A is relatively large, for example, if a voltage change per unit time is higher than or equal to a predetermined value, one of the transistors 231 and 232 may perform a switching operation, and if a voltage change per unit time is lower than the predetermined value, one of the transistors 231 and 232 may perform a linear operation.

Next, description will be made about how the drive circuits 120a and 120b are mounted on the main substrate 100.

Figure 13:
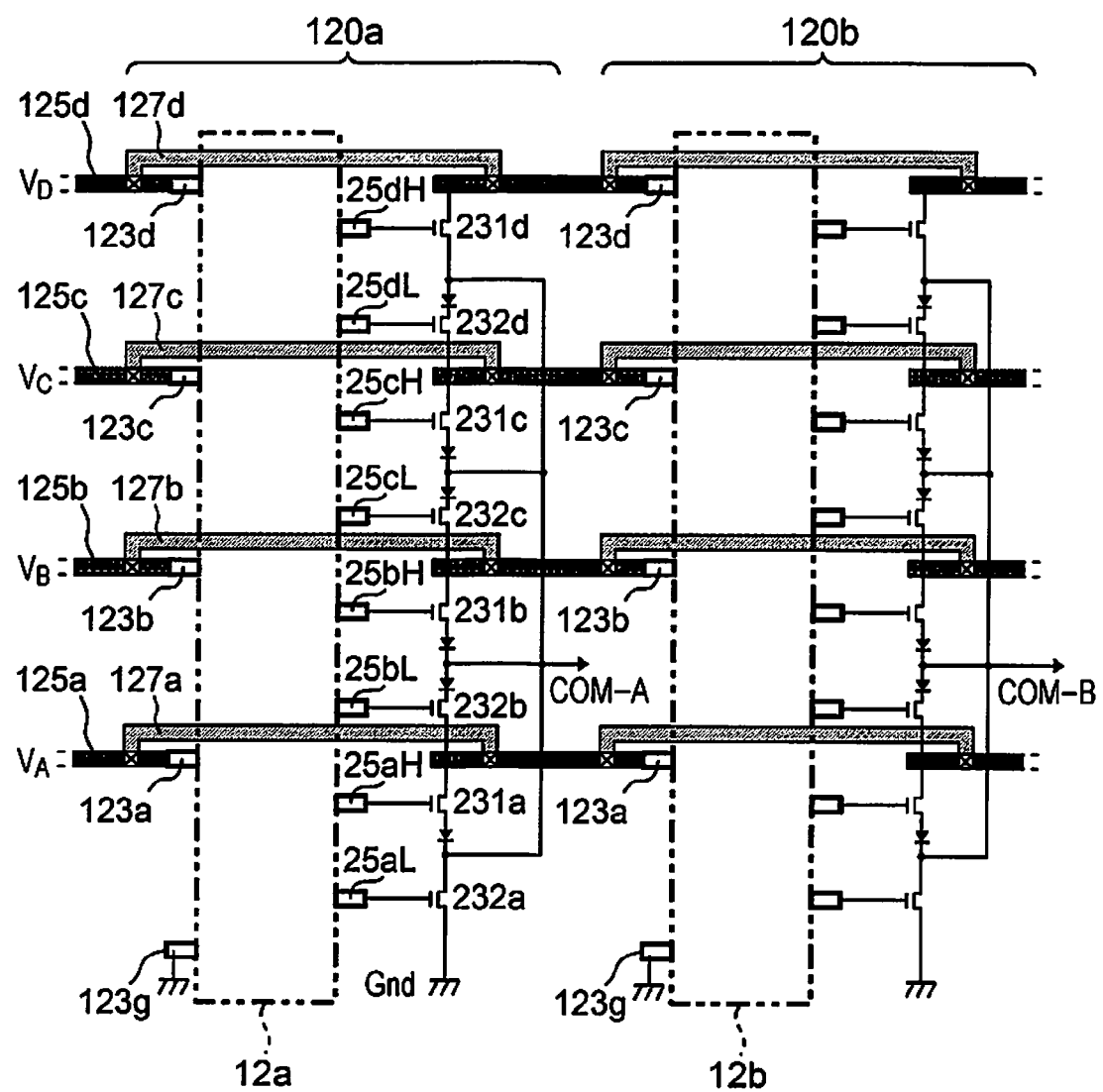
FIG. 13 is a view illustrating a mounting state of the drive circuit.

FIG. 13 is a view illustrating a mounting example of the drive circuits 120a and 120b when the main substrate 100 is viewed in a planar view.

In FIG. 13, the integrated circuit 12a (12b) is a semiconductor integrated circuit of a surface mount type which includes functions of, for example, the differential amplifier 221, the selector 223, the gate selectors 270a, 270b, 270c, and 270d, and the selector 280 in the drive circuit 120a (120b), and appearance thereof is a rectangular shape in a planar view, and is a so-called small outline package (SOP) of a surface mount type in which a plurality of leads (coupling terminals) are provided along two longitudinal sides. The integrated circuits 12a and 12b are arranged such that longitudinal directions thereof are aligned with each other.

In addition, in this example, the pairs of transistors, the diodes d1 and d2, the resistance elements Ru, R1, and R2 which are not illustrated in FIG. 13, and the capacitor C0 are externally attached to the integrated circuit 12a (12b). The DAC 113a (113b) may be embedded in the integrated circuit 12a (12b).

In addition, a shape of the integrated circuit 12a (12b) is not limited to the SOP, and may be, for example, a so-called quad flat package (QFP) having four sides on which, for example, leads are provided.

The integrated circuit 12a is a first integrated circuit, and the integrated circuit 12b is a second integrated circuit.

Hence, as illustrated in FIG. 13, each of the integrated circuits 12a and 12b includes leads 123a, 123b, 123c, and 123d which are arranged on one side (a left side in FIG. 13, a first side), and leads 25aH, 25aL, 25bH, 25bL, 25cH, 25cL, 25dH, and 25dL which are arranged on another side (a right side in FIG. 13, a second side).

Wires of a strip shape 125a, 125b, 125c, 125d, 127a, 127b, 127c, and 127d are provided to extend in a direction orthogonal to a longitudinal direction of the integrated circuits 12a and 12b on the main substrate 100, corresponding to the integrated circuits 12a and 12b, respectively.

In detail, in relation to the wires corresponding to the integrated circuit 12a, the wires 125a, 125b, 125c, and 125d are provided on one side of the integrated circuit 12a on a surface (mount surface) on a side on which the integrated circuits 12a and 12b are mounted, and meanwhile, the wires 127a, 127b, 127c, and 127d are provided on a surface other than the mount surface.

The surface other than the mount surface indicates a surface on a side opposite to the mount surface, or an intermediate layer if the main substrate 100 is a multi-layer substrate of three or more layers.

Here, the voltage $V_A$ of an auxiliary power supply circuit 117 which is not illustrated in FIG. 13 is applied to the wire 125a corresponding to the integrated circuit 12a, and the lead 123a of the integrated circuit 12a is coupled to the wire 125a by solder. For this reasons, the lead 123a functions as a first power supply terminal.

Meanwhile, one end of the wire 127a corresponding to the integrated circuit 12a is coupled to the wire 125a corresponding to the integrated circuit 12a through a contact hole which is denoted by an x mark of a quadrangle in the figure, and passes through a mount area of the integrated circuit 12a in a planar view, and is coupled to the wire 125a corresponding to the integrated circuit 12b through a contact hole in the periphery of another side of the integrated circuit 12a.

In the same manner, the voltage $V_B$ ($V_C$, $V_D$) is also applied to the wire 125b (125c, 125d) corresponding to the integrated circuit 12a, and the lead 123b (123c, 123d) of the integrated circuit 12a is coupled to the wire 125b. For this reasons, the lead 123b functions as a second power supply terminal.

The wire 127b (127c, 127d) corresponding to the integrated circuit 12a is the same as above. That is, one end of the wire 127b (127c, 127d) is coupled to the wire 125b (125c, 125d) corresponding to the integrated circuit 12a through a contact hole, and passes through the mount area of the integrated circuit 12a in a planar view, and is coupled to the wire 125b (125c, 125d) corresponding to the integrated circuit 12b through a contact hole in the periphery of another side of the integrated circuit 12a.

Hereinafter, wires corresponding to the integrated circuit 12a will be described, but wires corresponding to the integrated circuit 12b are the same as the wires corresponding to the integrated circuit 12a.

In addition, here, the wires 127a (127b, 127c, and 127d) are shown in a state of being bent so as not to overlap the wires 125a (125b, 125c, 125d) in a planar view for description, but may be provided so as to overlap, that is, may be provided in a straight line shape without being bent.

The lead 25aH and 25aL which function as first output terminals are output of the gate selector 270a (refer to FIG. 10), and are placed between the wire 127a to which the voltage $V_A$ is applied and a ground pattern G in a planar view. Among these, the lead 25aH is electrically coupled to a gate terminal of the transistor 231a, and the lead 25aL is electrically coupled to a gate terminal of the transistor 232a. Here, the transistors 231a and 232a are placed between the wire 125a and the ground pattern G, and is mounted on, for example, a rear surface with respect to the mount surface of the integrated circuits 12a and 12b, in a planar view.

The lead 25bH and 25bL which function as second output terminals are output of the gate selector 270b, are placed between the wire 127b to which the voltage $V_B$ is applied and the wire 127a to which the voltage $V_A$ is applied in a planar view, and are mounted on a rear surface on a side opposite to the integrated circuits 12a and 12b.

In the same manner, the lead 25tH and 25cL (25dH and 25dL) which function as third output terminals are output of the gate selector 270c (270d), are placed between the wire 127c (127d) to which the voltage $V_C$ ($V_D$) is applied and the wire 127b (127c) to which the voltage $V_B$ ($V_C$) is applied in a planar view, and are mounted on the rear surface on a side opposite to the integrated circuits 12a and 12b.

The transistors 231a, 232a, 231b, 232b, 231c, 232c, 231d, and 232d may be mounted on the same surface as the mount surface of the integrated circuits 12a and 12b.

The drive circuits 120a and 120b, the DACs 113a and 113b, and the auxiliary power supply circuit 117 are provided on the main substrate 100, but may be configured to be provided in the carriage 20 (or the head unit 3) together with the IC 50. If the drive circuits 120a and 120b are provided on the head unit 3 side, a signal with a large amplitude is not necessary to supply through the FPC 190, and thus, it is possible to improve anti-noise characteristics.

In this way, the wires 125a (127a), 125b (127b), 125c (127c), and 125d (127d) which supply power supplies of the respective pairs of transistors are disposed to extend in a horizontal direction in a planar view, and the leads, particularly, the leads 123a, 123b, 123c, and 123d which are coupled to the power supply voltage, and the leads 25aH, 25aL, 25bH, 25bL, 25cH, 25cL, 25dH, and 25dL which are coupled to gate terminals of the pairs of transistors that use the power supplies are provided in the integrated circuits 12a and 12b, with respect to the disposition. Accordingly, it is possible to efficiently dispose the integrated circuits 12a and 12b and elements such as transistors in the main substrate 100.

In this way, if the elements can be efficiently disposed, it is easy to sufficiently secure line widths of the wires 125a (127a), 125b (127b), 125c (127c), and 125d (127d), and thus, it is possible to reduce resistance of the wire.

In the invention, the drive circuit is not limited to the drive circuits 120a and 120b illustrated in FIG. 4 and FIG. 10, and can be applied to a drive circuit which amplifies input and output signals by using a plurality of voltages to drive a capacitive load such as the piezoelectric element Pzt.

Figure 14:
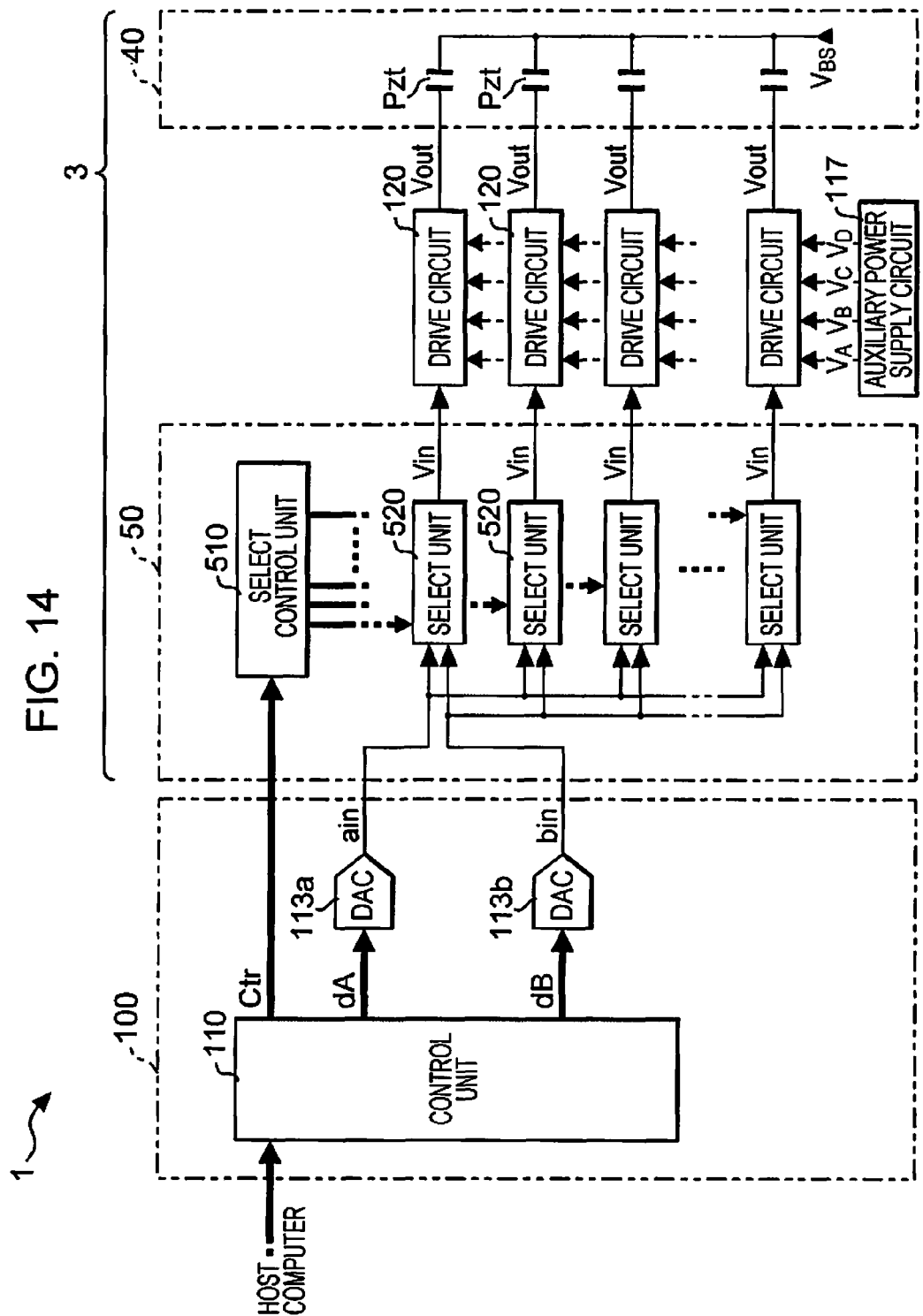
FIG. 14 is a diagram illustrating a schematic configuration of a printing apparatus to which a drive circuit according to another example is applied.
Figure 15:
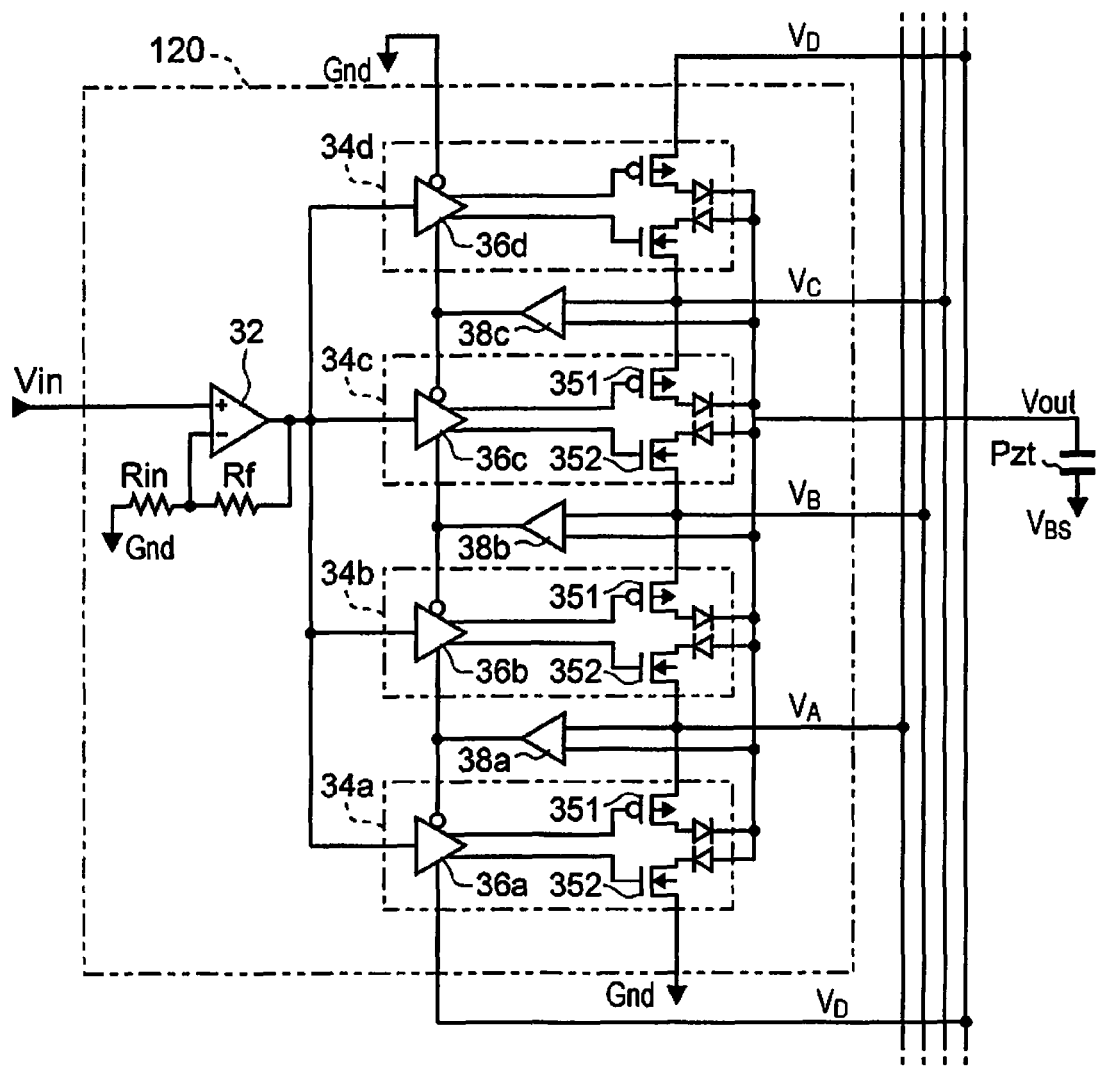
FIG. 15 is a diagram illustrating a configuration of the drive circuit according to another example.

FIG. 14 is a block diagram illustrating an electrical configuration of a printing apparatus to which a drive circuit according to another example is applied. FIG. 15 is a diagram illustrating a configuration of the drive circuit according to another example.

A difference between the printing apparatus illustrated in FIG. 14 and the printing apparatus illustrated in FIG. 4 is that the outputs of the DACs 113a and 113b are supplied to the select unit 520 of the head unit 3 through the flexible flat cable 190 (not illustrated in FIG. 14) and the output of the select unit 520 is amplified by the drive circuit 120 corresponding to the piezoelectric element Pzt to be supplied to one terminal of the piezoelectric element Pzt.

The drive circuit 120 illustrated in FIG. 15 is configured to voltage-amplify a signal of the voltage Vin selected by the select unit 520 by using four types of voltages $V_A$, $V_B$, $V_C$, and $V_D$ in the same manner as the drive circuit 120a (120b) illustrated in FIG. 10 except for the ground Gnd of zero volts, convert the signal into low impedance, drive the piezoelectric element Pzt by using a drive signal of the voltage Vout, and include an operational amplifier 32, unit circuits 34a to 34d, and comparators 38a to 38c. Among these, the unit circuit 34a includes a level shifter 36a, transistors 351 and 352 which configure a pair of transistors, and a diode for blocking a reverse current. In the same manner, the unit circuit 34b (34c, 34d) also includes a level shifter 36b (36c, 36d), the transistors 351 and 352, and the diode for blocking a reverse current.

In the drive circuit 120, for example, the operational amplifier 32, the level shifters 36a to 36d, and the comparators 38a to 38c are integrated into a semiconductor integrated circuit.

For this reasons, the drive circuit 120 according to another example can also apply the disposition illustrated in FIG. 13 to leads which receive the voltages $V_A$, $V_B$, $V_C$, and $V_D$, leads which outputs voltages to gate terminals of the transistors 351 and 352, and pairs of transistors between wires which supply the voltages $V_A$, $V_B$, $V_C$, and $V_D$.

Detailed description on functions and operations of each unit in the drive circuit 120 are made in, for example, JP-A-2014-184569, thereby, being omitted.

According to the configurations illustrated in FIG. 14 and FIG. 15, resistance of wires can be reduced by efficient disposition of elements in the main substrate 100, and the signals ain and bin with a small amplitude are supplied through the flexible flat cable 190, and thus, it is possible to reduce effects of a decrease or the like of print quality due to power loss or waveform distortion, compared with a case where the drive signals COM-A and COM-B with a large amplitude are supplied.

In the configuration illustrated in FIG. 14, the DACs 113a and 113b may be provided on the head unit side.

In the aforementioned description, the high side transistor of the pair of transistors is configured by a P-channel transistor and the low side transistor thereof is configured by an N-channel transistor, the high side transistor and the low side transistor may be any one of the P-channel transistor and the N-channel transistor.

In addition, in the aforementioned description, the drive circuit (120a, 120b, 120) is configured to amplify a voltage by using four types of the voltages $V_A$, $V_B$, $V_C$, and $V_D$ except for the ground Gnd and convert the signal into low impedance, but the voltages may be two or more types, and thus, for example, five or more types of voltages may be used, and three types of voltages may be used. In addition, an interval between the voltages do not necessarily have to be equal interval.

In the aforementioned description, the liquid ejecting apparatus is described as a printing apparatus, but the liquid ejecting apparatus may be a three-dimension shaping apparatus which ejects liquid to form a three-dimensional object, a textile printing apparatus which ejects liquid to print onto a textile, or the like.

In addition, the drive circuit is provided on the main substrate 100 side, but may be configured to be provided in the carriage 20 (or the head unit 3) side together with the IC 50. If the drive circuit is provided on the head unit 3 side, the drive signals COM-A and COM-B with a large amplitude are not necessary to supply through the flexible flat cable 190, and thus, it is possible to improve anti-noise characteristics.

Furthermore, in the above description, an example is described in which the piezoelectric element Pzt for ejecting ink is used as a drive target of the drive circuit (120a, 120b, 120), but when considering that the drive circuit is separated from the printing apparatus, the drive target is not limited to the piezoelectric element Pzt, and can be applied to all of a load with capacitive components, such as an ultrasonic motor, a touch panel, an electrostatic speaker, or a liquid crystal panel.

What is claimed is:
1. A liquid ejecting apparatus comprising:
an ejecting unit that includes a piezoelectric element and ejects liquid by driving the piezoelectric element;
a first drive circuit that generates a drive signal from an original drive signal which is an origin of the drive signal driving the piezoelectric element in accordance with a first voltage and a second voltage higher than the first voltage; and
a circuit substrate in which the first drive circuit is disposed, wherein the first drive circuit includes,
- a first pair of transistors to which the first voltage is applied;
- a second pair of transistors which is electrically coupled in series to the first pair of transistors and to which the second voltage is applied; and
- a first integrated circuit having a shape which includes a first side and a second side different from the first side, wherein the first integrated circuit includes,
- a first power supply terminal to which the first voltage is applied;
- a second power supply terminal to which the second voltage is applied;
- a first output terminal which outputs a first control signal for controlling the first pair of transistors in accordance with the original drive signal; and
- a second output terminal which outputs a second control signal for controlling the second pair of transistors in accordance with the original drive signal, wherein the first pair of transistors is electrically coupled to the first power supply terminal through a first power supply wire which is provided on the circuit substrate, wherein the second pair of transistors is electrically coupled to the second power supply terminal through a second power supply wire which is provided on the circuit substrate, wherein the first power supply terminal and the second power supply terminal are disposed along the first side, and wherein the first output terminal and the second output terminal are disposed along the second side.

2. The liquid ejecting apparatus according to claim 1, wherein the first side and the second side face each other.

3. The liquid ejecting apparatus according to claim 1, wherein the first power supply wire and the second power supply wire are disposed in a position where the circuit substrate overlaps the first integrated circuit in a planar view.

4. The liquid ejecting apparatus according to claim 1,
- wherein a second drive circuit including a second integrated circuit is disposed in the circuit substrate, and
- wherein the first side of the first integrated circuit and the second side of the second integrated circuit are respectively disposed in positions where they face each other.

5. A drive circuit which is provided on a circuit substrate, generates a drive signal from an original drive signal, and drives a capacitive load in accordance with the drive signal, the circuit comprising:
- a first pair of transistors to which a first voltage is applied;
- a second pair of transistors which is electrically coupled in series to the first pair of transistors and to which a second voltage higher than the first voltage is applied; and
- an integrated circuit having a shape which includes a first side and a second side different from the first side, wherein the integrated circuit includes,
- a first power supply terminal to which the first voltage is applied;
- a second power supply terminal to which the second voltage is applied;
- a first output terminal which outputs a first control signal for controlling the first pair of transistors in accordance with the original drive signal; and
- a second output terminal which outputs a second control signal for controlling the second pair of transistors in accordance with the original drive signal, wherein the first pair of transistors is electrically coupled to the first power supply terminal through a first power supply wire which is provided on the circuit substrate, wherein the second pair of transistors is electrically coupled to the second power supply terminal through a second power supply wire which is provided on the circuit substrate, wherein the first power supply terminal and the second power supply terminal are disposed along the first side, and wherein the first output terminal and the second output terminal are disposed along the second side.

6. An integrated circuit which is provided on a circuit substrate and configures a drive circuit that includes a first pair of transistors which generates a drive signal from an original drive signal and drives a capacitive load in accordance with the drive signal and to which a first voltage is applied, and a second pair of transistors which is electrically coupled in series to the first pair of transistors and to which a second voltage higher than the first voltage is applied, the circuit comprising:
- a first power supply terminal to which the first voltage is applied;
- a second power supply terminal to which the second voltage is applied;
- a first output terminal which outputs a first control signal for controlling the first pair of transistors in accordance with the original drive signal; and
- a second output terminal which outputs a second control signal for controlling the second pair of transistors in accordance with the original drive signal, wherein the integrated circuit has a shape which includes a first side and a second side different from the first side, wherein the first power supply terminal and the second power supply terminal are disposed along the first side, wherein the first output terminal and the second output terminal are disposed along the second side, and wherein the circuit substrate includes a first power supply wire for electrically coupling the first pair of transistors to the first power supply terminal, and a second power supply wire for electrically coupling the second pair of transistors to the second power supply terminal.

* * * * *